(12) United States Patent
Aiba et al.

(10) Patent No.: US 10,945,221 B2
(45) Date of Patent: *Mar. 9, 2021

(54) POWER HEADROOM CONFIGURATION FOR PRIMARY AND SECONDARY CELLS BASED ON PUCCH ACTIVATION

(71) Applicant: Sharp Kabushiki Kaisha, Sakai (JP)

(72) Inventors: Tatsushi Aiba, Sakai (JP); Shoichi Suzuki, Sakai (JP); Kazunari Yokomakura, Sakai (JP); Hiroki Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/443,907

(22) Filed: Jun. 18, 2019

(65) Prior Publication Data

US 2019/0306810 A1 Oct. 3, 2019

Related U.S. Application Data

(63) Continuation of application No. 15/749,512, filed as application No. PCT/JP2016/072151 on Jul. 28, 2016, now Pat. No. 10,420,043.

(30) Foreign Application Priority Data

Aug. 5, 2015 (JP) ................................ 2015-154652

(51) Int. Cl.
*H04W 24/10* (2009.01)
*H04W 52/30* (2009.01)
(Continued)

(52) U.S. Cl.
CPC ......... *H04W 52/365* (2013.01); *H04W 24/10* (2013.01); *H04W 52/146* (2013.01);
(Continued)

(58) Field of Classification Search
CPC . H04W 52/325; H04W 52/146; H04W 24/10; H04W 52/30; H04W 52/34; H04W 52/365; H04W 72/04; H04W 72/0413
(Continued)

(56) References Cited

U.S. PATENT DOCUMENTS

| 10,420,043 B2* | 9/2019 | Aiba .................. H04W 72/0413 |
| 2016/0150485 A1* | 5/2016 | Yi ..................... H04W 72/0413 |
| | | 370/311 |
| 2016/0270094 A1* | 9/2016 | Dinan ................. H04W 52/325 |

FOREIGN PATENT DOCUMENTS

WO 2015/093746 A1 6/2015

OTHER PUBLICATIONS

Aiba et al., "Power Headroom Configuration for Primary and Secondary Cells Based on PUCCH Activation", U.S. Appl. No. 15/749,512, filed Feb. 1, 2018.
(Continued)

*Primary Examiner* — Phili Sobutka
(74) *Attorney, Agent, or Firm* — Keating & Bennett, LLP

(57) ABSTRACT

Processing relating to transmit power is efficiently performed. A terminal device includes a reception unit configured to receive a first parameter and a second parameter, and a first MAC processing unit configured to acquire a type 2 power headroom. The first MAC processing unit acquires a value of the type 2 power headroom for a primary cell, in a case that the first parameter is configured and that simultaneous transmissions on a Physical Uplink Control CHannel (PUCCH) and on a Physical Uplink Shared CHannel (PUSCH) are configured, and acquires a value of the type 2 power headroom for the primary cell, regardless of whether simultaneous transmissions on the Physical Uplink Control (Continued)

CHannel (PUCCH) and on the Physical Uplink Shared CHannel (PUSCH) are configured in a case that the second parameter is configured.

8 Claims, 9 Drawing Sheets

(51) Int. Cl.
    *H04W 52/32*     (2009.01)
    *H04W 52/36*     (2009.01)
    *H04W 52/14*     (2009.01)
    *H04W 72/04*     (2009.01)
    *H04W 52/34*     (2009.01)

(52) U.S. Cl.
    CPC ......... *H04W 52/30* (2013.01); *H04W 52/325* (2013.01); *H04W 52/34* (2013.01); *H04W 72/04* (2013.01); *H04W 72/0413* (2013.01)

(58) Field of Classification Search
    USPC ........................................................ 455/522
    See application file for complete search history.

(56) References Cited

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 12)", 3GPP TS 36.321 V12.6.0, Jun. 2015, 13 pages.

\* cited by examiner

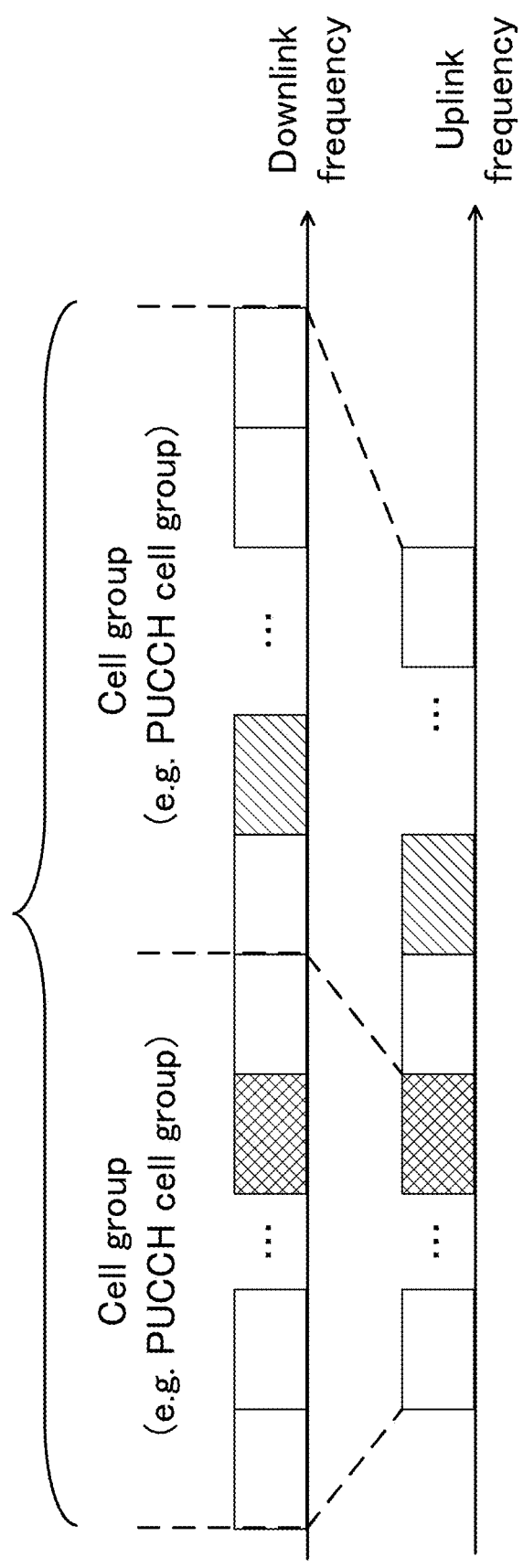

Example 2

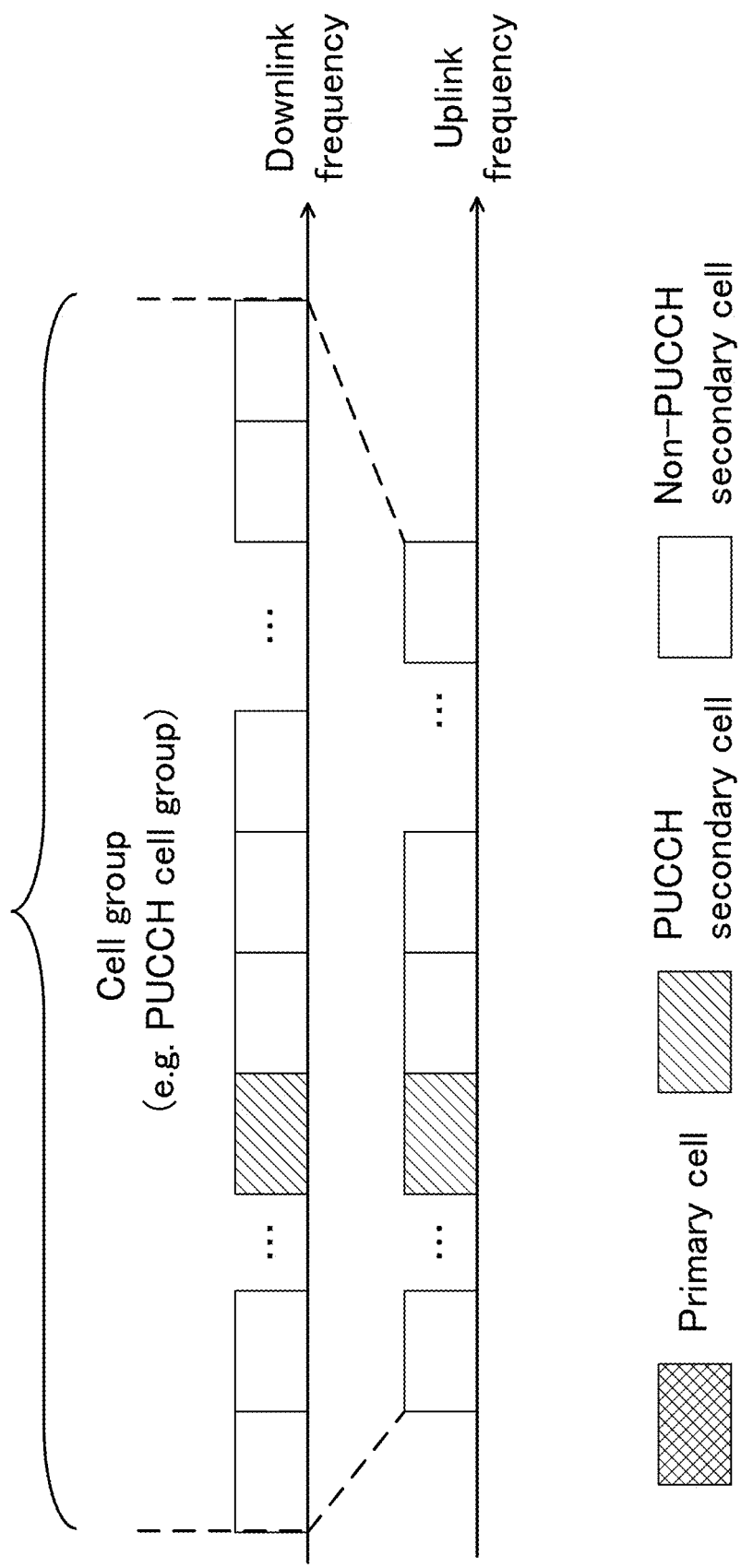

FIG. 3

If the MAC entity has UL resources allocated for new transmission for this TTI the MAC entity shall:

- if *extended-PHR* is configured:
  - if *simultaneousPUCCH-PUSCH* is configured:
    - obtain the value of the Type 2 power headroom for the PCell;
- else if *ScellPUCCH-PHR* is configured:
  - obtain the value of the Type 2 power headroom for the PCell;
  - if the MAC entity is configured with the SCell with PUCCH resources and the SCell with PUCCH resources is activated (i.e. if the MAC entity has the activated SCell with PUCCH resources):
    - obtain the value of the Type 2 power headroom for the SCell with PUCCH resources;
- else if *dualConnectivity-PHR* is configured:
  - if *simultaneousPUCCH-PUSCH* is configured:
    - obtain the value of the Type 2 power headroom for the SpCell;
    - obtain the value of the Type 2 power headroom for the SpCell of the other MAC entity;

FIG. 4

If the MAC entity has UL resources allocated for new transmission for this TTI the MAC entity shall:

- if *extended-PHR* is configured:
  - if the MAC entity is configured with the Scell with PUCCH resources:
    - obtain the value of the Type 2 power headroom for the PCell;
    - if the Scell with PUCCH resources is activated:
      - obtain the value of the Type 2 power headroom for the SCell with PUCCH resources;
  - else if *simultaneousPUCCH-PUSCH* is configured:
    - obtain the value of the Type 2 power headroom for the PCell;
- else if *dualConnectivity-PHR* is configured:
  - if *simultaneousPUCCH-PUSCH* is configured:
    - obtain the value of the Type 2 power headroom for the SpCell;
  - obtain the value of the Type 2 power headroom for the SpCell of the other MAC entity;

FIG. 5

If the MAC entity has UL resources allocated for new transmission for this TTI the MAC entity shall:

- if *extended-PHR* is configured:
  - if *simultaneousPUCCH-PUSCH* is configured:
    - obtain the value of the Type 2 power headroom for the PCell;
- else if dualConnectivity-PHR is configured:
  - if *simultaneousPUCCH-PUSCH* is configured or if the MAC entity is configured with the Scell with PUCCH resources:
    - obtain the value of the Type 2 power headroom for the SpCell;
  - if two MAC entities are configured in the UE:
    - obtain the value of the Type 2 power headroom for the SpCell of the other MAC entity;
  - if the MAC entity is configured with the Scell with PUCCH resources:
    - obtain the value of the Type 2 power headroom for the SCell with PUCCH resources;

POWER HEADROOM CONFIGURATION FOR PRIMARY AND SECONDARY CELLS BASED ON PUCCH ACTIVATION

TECHNICAL FIELD

The present invention relates to a terminal device, a base station device, a communication method, and an integrated circuit.

This application claims priority based on JP 2015-154652 filed on Aug. 5, 2015, the contents of which are incorporated herein by reference.

BACKGROUND ART

In the 3rd Generation Partnership Project (3GPP), a radio access method and a radio network for cellular mobile communications (hereinafter, referred to as "Long Term Evolution (LTE)", or "Evolved Universal Terrestrial Radio Access (EUTRA)") have been studied. In LTE, a base station device is also referred to as an evolved NodeB (eNodeB), and a terminal device is also referred to as User Equipment (UE). LTE is a cellular communication system in which each of multiple areas covered by the base station device is deployed to form a cellular structure. In such a cellular communication system, a single base station device may manage multiple cells.

LTE supports a Time Division Duplex (TDD). LTE that employs the TDD scheme is also referred to as TD-LTE or LTE TDD. In TDD, uplink signals and downlink signals are time division multiplexed. Furthermore, LTE supports a Frequency Division Duplex (FDD).

In 3GPP, career aggregation has been specified which allows a terminal device to simultaneous transmission(s) and/or reception(s) in up to five serving cells (component careers).

In addition, in 3GPP, a configuration where a terminal device performs simultaneous transmissions and/or receptions in more than five serving cells (component careers) has been considered. Furthermore, a configuration where a terminal device transmits a physical uplink control channel on a secondary cell which is a serving cell other than a primary cell has been considered (NPL 1).

CITATION LIST

Non Patent Literature

NPL 1: "New WI proposal: LTE Carrier Aggregation Enhancement Beyond 5 Carriers", RP-142286, Nokia Corporation, NTT DoCoMo Inc., Nokia Networks, 3GPP TSG RAN Meeting #66, Hawaii, United States of America, 8-11 Dec. 2014.

DISCLOSURE OF THE INVENTION

Problems to be Solved by the Invention

However, for the above-described radio communication systems, a specific method for a case of performing processing relating to transmit power by a terminal device has not been sufficiently discussed.

The present invention has been made in light of the circumstances, and an object is to provide a terminal device, a base station device, a communication method, and an integrated circuit, which enable processing relating to transmit power to be efficiently performed by a terminal device.

Means for Solving the Problems (1) In order to accomplish the object described above, aspects of the present invention provide the following measures. Specifically, a terminal device according to an aspect of the present invention for communicating with a base station device by using a plurality of serving cells including a primary cell and a secondary cell, the terminal device including a reception unit configured to receive a first parameter used to indicate that a power headroom is to be reported using a first MAC control element (Extended Power Headroom MAC control element), and to receive a second parameter used to indicate simultaneous transmissions on a Physical Uplink Control CHannel (PUCCH) and a Physical Uplink Shared CHannel (PUSCH), and a MAC processing unit configured to acquire a type 2 power headroom. The MAC processing unit acquires a value of the type 2 power headroom for the secondary cell with the PUCCH configured, based on the first parameter being configured, the PUCCH being configured for the secondary cell, and the secondary cell with the PUCCH configured being activated, and acquires a value of the type 2 power headroom for the primary cell, based on the first parameter being configured, the PUCCH not being configured for the secondary cell, and the second parameter being configured for the primary cell.

(2) A base station device according to an aspect of the present invention for communicating with a terminal device by using a plurality of serving cells including a primary cell and a secondary cell, the base station device including a transmission unit configured to transmit a first parameter used to indicate that a power headroom is to be reported using a first MAC control element (Extended Power Headroom MAC control element), and to transmit a second parameter used to indicate simultaneous transmissions on a Physical Uplink Control CHannel (PUCCH) and a Physical Uplink Shared CHannel (PUSCH), and a reception unit configured to receive a type 2 power headroom. The reception unit receives a value of the type 2 power headroom for the secondary cell with the PUCCH configured, based on the first parameter being configured, the PUCCH being configured for the secondary cell, and the secondary cell with the PUCCH configured being activated, and receives a value of the type 2 power headroom for the primary cell, based on the first parameter being configured, the PUCCH not being configured for the secondary cell, and the second parameter being configured for the primary cell.

(3) Moreover, a communication method for a terminal device according to an aspect of the present invention for communicating with a base station device by using a plurality of serving cells including a primary cell and a secondary cell, the communication method including the steps of receiving a first parameter used to indicate that a power headroom is to be reported using a first MAC control element (Extended Power Headroom MAC control element), receiving a second parameter used to indicate simultaneous transmissions on a Physical Uplink Control CHannel (PUCCH) and a Physical Uplink Shared CHannel (PUSCH), acquiring a value of the type 2 power headroom for the secondary cell with the PUCCH configured, based on the first parameter being configured, the PUCCH being configured for the secondary cell, and the secondary cell with the PUCCH configured being activated, and acquiring a value of the type 2 power headroom for the primary cell, based on the first parameter being configured, the PUCCH not being configured for the secondary cell, and the second parameter being configured for the primary cell.

(4) A communication method for a base station device according to an aspect of the present invention for communicating with a terminal device using a plurality of serving cells including a primary cell and a secondary cell, the communication method including the steps of transmitting a first parameter used to indicate that a power headroom is to be reported using a first MAC control element (Extended Power Headroom MAC control element), transmitting a second parameter used to indicate simultaneous transmissions on a Physical Uplink Control CHannel (PUCCH) and a Physical Uplink Shared CHannel (PUSCH), receiving a value of the type 2 power headroom for the secondary cell with the PUCCH configured, based on the first parameter being configured, the PUCCH being configured for the secondary cell, and the secondary cell with the PUCCH configured being activated, and receiving a value of the type 2 power headroom for the primary cell, based on the first parameter being configured, the PUCCH not being configured for the secondary cell, and the second parameter being configured for the primary cell.

(5) Moreover, an integrated circuit according to an aspect of the present invention to be mounted in a terminal device for communicating with a base station device by using a plurality of serving cells including a primary cell and a secondary cell, the integrated circuit causing the terminal device to perform a function configured to receive a first parameter used to indicate that a power headroom is to be reported using a first MAC control element (Extended Power Headroom MAC control element), and to receive a second parameter used to indicate simultaneous transmissions on a Physical Uplink Control CHannel (PUCCH) and a Physical Uplink Shared CHannel (PUSCH), and a function configured to acquire a value of a type 2 power headroom for the secondary cell with the PUCCH configured, based on the first parameter being configured, the PUCCH being configured for the secondary cell, and the secondary cell with the PUCCH configured being activated, and to acquire a value of the type 2 power headroom for the primary cell, based on the first parameter being configured, the PUCCH not being configured for the secondary cell, and the second parameter being configured for the primary cell.

(6) An integrated circuit according to an aspect of the present invention to be mounted in a base station device for communicating with a terminal device by using a plurality of serving cells including a primary cell and a secondary cell, the integrated circuit causing the base station device to perform a function configured to transmit a first parameter used to indicate that a power headroom is to be reported using a first MAC control element (Extended Power Headroom MAC control element), and to transmit a second parameter used to indicate simultaneous transmissions on a Physical Uplink Control CHannel (PUCCH) and a Physical Uplink Shared CHannel (PUSCH), and a function configured to receive a value of a type 2 power headroom for the secondary cell with the PUCCH configured, based on the first parameter being configured, the PUCCH being configured for the secondary cell, and the secondary cell with the PUCCH configured being activated, and to receive a value of the type 2 power headroom for the primary cell, based on the first parameter being configured, the PUCCH not being configured for the secondary cell, and the second parameter being configured for the primary cell.

Effects of the Invention

According to some aspects of the present invention, the terminal device efficiently performs processing relating to transmit power.

BRIEF DESCRIPTION OF THE DRAWINGS

FIG. 2A to FIG. 2C are diagrams illustrating cell groups according to the present embodiment.

FIG. 3 is a diagram illustrating an operation in a terminal device according to the present embodiment.

FIG. 4 is another diagram illustrating the operation in the terminal device according to the present embodiment.

FIG. 5 is still another diagram illustrating the operation in the terminal device according to the present embodiment.

MODE FOR CARRYING OUT THE INVENTION

Embodiments of the present invention will be described below.

Figure 1:
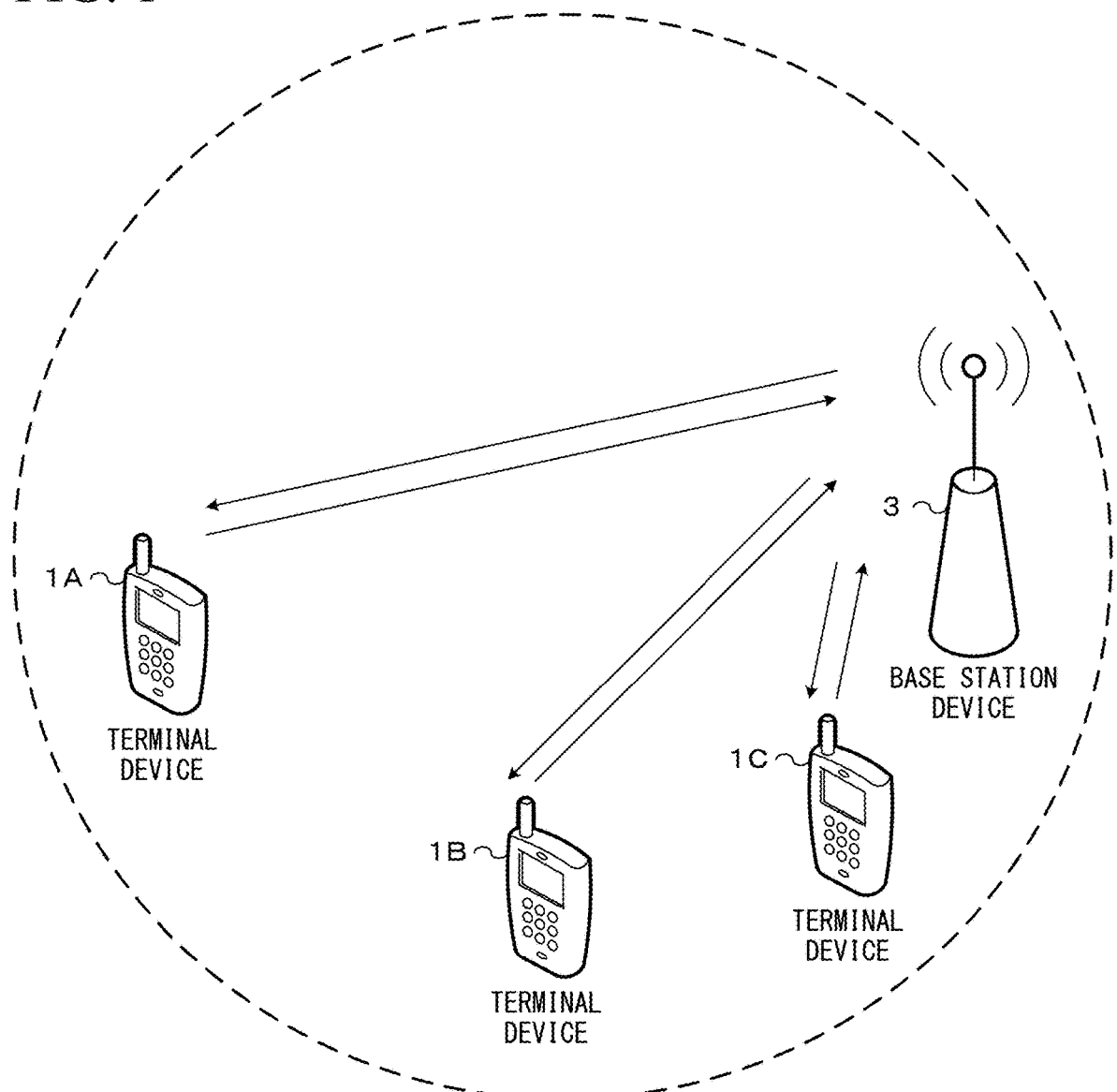
FIG. 1 is a diagram illustrating a concept of a radio communication system according to the present embodiment.

FIG. 1 is a conceptual diagram of a radio communication system according to the present embodiment. In FIG. 1, the radio communication system includes terminal devices 1A to 1C and a base station device 3. Hereinafter, each of the terminal devices 1A to 1C is also referred to as a terminal device 1.

Physical channels and physical signals according to the present embodiment will be described.

With respect to FIG. 1, the following uplink physical channels are used for uplink radio communication from the terminal device 1 to the base station device 3. Here, the uplink physical channels are used to transmit information output from the higher layers.

Physical Uplink Control CHannel (PUCCH)
Physical Uplink Shared CHannel (PUSCH)
Physical Random Access CHannel (PRACH)

The PUCCH is used for transmission of Uplink Control Information (UCI). Here, the uplink control information may include Channel State Information (CSI) used to indicate a downlink channel state. The uplink control information may include Scheduling Request (SR) used to request an UL-SCH resource. The uplink control information may include Hybrid Automatic Repeat request ACKnowledgment (HARQ-ACK). HARQ-ACK may indicate HARQ-ACK for downlink data (Transport block, Medium Access Control Protocol Data Unit (MAC PDU), Downlink-Shared CHannel (DL-SCH), or Physical Downlink Shared CHannel (PDSCH)).

In other words, HARQ-ACK may indicate acknowledgment (ACK) or negative-acknowledgment (NACK). Here, HARQ-ACK may also be referred to as ACK/NACK, HARQ feedback, HARQ acknowledgment, HARQ information, or HARQ control information.

The PUSCH is used for transmission of uplink data (UpLink-Shared CHannel (UL-SCH)). Furthermore, the PUSCH may be used to transmit HARQ-ACK and/or CSI along with the uplink data. Furthermore, the PUSCH may be used to transmit CSI only or HARQ-ACK and CSI only. In other words, the PUSCH may be used to transmit the uplink control information only.

Here, the base station device 3 and the terminal device 1 exchange (transmit and/or receive) signals with each other in their respective higher layers. For example, the base station device 3 and the terminal device 1 may transmit and/or receive Radio Resource Control (RRC) signaling (also referred to as RRC message or RRC information) in the RRC layer. The base station device 3 and the terminal device 1 may transmit and/or receive a Medium Access Control (MAC) element in the MAC layer, respectively. Here, the RRC signaling and/or the MAC control element is also referred to as higher layer signaling.

The PUSCH may be used to transmit the RRC signaling and the MAC control element. Here, the RRC signaling transmitted from the base station device 3 may be signaling common to multiple terminal devices 1 in a cell. The RRC signaling transmitted from the base station device 3 may be signaling dedicated to a certain terminal device 1 (also referred to as dedicated signaling). In other words, user-equipment-specific information (information unique to user equipment) may be transmitted through signaling dedicated to the certain terminal device 1.

The PRACH is used to transmit a random access preamble. The PRACH may be used for an initial connection establishment procedure, a handover procedure, a connection re-establishment procedure, uplink transmission synchronization (Timing Adjustment), and designating a PUCCH resource request.

In FIG. 1, the following uplink physical signal is used in the uplink radio communication. Here, the uplink physical signal is not used to transmit information output from the higher layers but is used by the physical layer.

UpLink Reference Signal (UL RS)

According to the present embodiment, the following two types of uplink reference signals are used.

DeModulation Reference Signal (DMRS)
Sounding Reference Signal (SRS)

The DMRS is associated with transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both of the PUSCH and the DMRS is hereinafter referred to simply as transmission of the PUSCH. Transmission of both of the PUCCH and the DMRS is hereinafter referred to simply as transmission of the PUCCH.

The SRS is not associated with the transmission of the PUSCH or the PUCCH. The base station device 3 uses the SRS in order to measure an uplink channel state.

In FIG. 1, the following downlink physical channels are used for downlink radio communication from the base station device 3 to the terminal device 1. Here, the downlink physical channels are used to transmit the information output from the higher layers.

Physical Broadcast CHannel (PBCH)
Physical Control Format Indicator CHannel (PCFICH)
Physical Hybrid automatic repeat request Indicator CHannel (PHICH)
Physical Downlink Control CHannel (PDCCH)
Enhanced Physical Downlink Control CHannel (EPDCCH)
Physical Downlink Shared CHannel (PDSCH)
Physical Multicast CHannel (PMCH)

The PBCH is used for broadcasting a Master Information Block (MIB), or a Broadcast CHannel (BCH), that is shared by the terminal devices 1.

The PCFICH is used for transmission of information indicating a region (OFDM symbols) to be used for transmission of the PDCCH.

The PHICH is used for transmission of a HARQ indicator (HARQ feedback or response information) indicating an ACKnowledgement (ACK) or a Negative ACKnowledgement (NACK) for the uplink data (UpLink Shared CHannel (UL-SCH)) received by the base station device 3.

The PDCCH and the EPDCCH are used for transmission of Downlink Control Information (DCI). Here, multiple DCI formats are defined for transmission of the downlink control information. In other words, a field for the downlink control information is defined in a DCI format and is mapped to information bits.

For example, DCI formats for downlink (e.g., DCI format 1A and DCI format 1C) to be used for the scheduling of one PDSCH in one cell (transmission of a single downlink transport block) may be defined.

Here, each of the downlink DCI formats includes information on the scheduling of the PDSCH. For example, the downlink DCI format includes downlink control information such as a Carrier Indicator Field (CIF), information on resource block assignment, or information on a Modulation and Coding Scheme (MCS). Here, the downlink DCI format is also referred to as downlink grant or downlink assignment.

Furthermore, for example, DCI formats for uplink (e.g., DCI format 0 and DCI format 4) to be used for the scheduling of one PUSCH in one cell (transmission of a single uplink transport block) are defined.

Here, each of the uplink DCI formats includes information on the scheduling of the PUSCH. For example, the uplink DCI format includes downlink control information such as a Carrier Indicator Field (CIF), information on Resource block assignment and/or hopping resource allocation, information on Modulation and Coding Scheme (MCS) and/or redundancy version, or information used for designating the number of transmission layers (precoding information and the number of layers). Here, the uplink DCI format is also referred to as uplink grant or uplink assignment.

In a case where a PDSCH resource is scheduled in accordance with the downlink assignment, the terminal device 1 may receive downlink data on the scheduled PDSCH. In a case where a PUSCH resource is scheduled in accordance with the uplink grant, the terminal device 1 may transmit uplink data and/or uplink control information on the scheduled PUSCH.

Here, the terminal device 1 may monitor a set of PDCCH candidates and/or EPDCCH candidates. The PDCCH may indicate a PDCCH and/or an EPDDCH below. Here, the PDCCH candidates are candidates which the PDCCH may be mapped to and/or transmitted on by the base station device 3. Furthermore "monitor" may imply that the terminal device 1 attempts to decode each PDCCH in the set of PDCCH candidates in accordance with each of all the monitored DCI formats.

The set of PDCCH candidates to be monitored by the terminal device 1 is also referred to as a search space. The search space may include a Common Search Space (CSS). For example, the CSS may be defined as a space common to multiple terminal devices 1. The search space may include a UE-specific Search Space (USS). For example, the USS may be defined at least based on a C-RNTI assigned to the terminal device 1. The terminal device 1 may monitor PDCCHs in CS S/or USS to detect a PDCCH destined for the terminal device 1 itself.

Here, an RNTI assigned to the terminal device 1 by the base station device 3 is used for the transmission of downlink control information (transmission on the PDCCH). Specifically, Cyclic Redundancy Check (CRC) parity bits are attached to a DCI format (or downlink control information), and after the attachment, the CRC parity bits are scrambled with the RNTI. Here, the CRC parity bits attached to the DCI format may be obtained from the payload of the DCI format.

The terminal device 1 attempts to decode the DCI format to which the CRC parity bits scrambled with the RNTI have been attached, and detects, as a DCI format destined for the terminal device 1 itself, the DCI format for which the CRC has been successful (also referred to as blind coding). In other words, the terminal device 1 may detect the PDCCH with CRC scrambled with the RNTI. The terminal device 1 may detect the PDCCH including the DCI format to which the CRC parity bits scrambled with the RNTI have been attached.

Here, the RNTI may include a Cell-Radio Network Temporary Identifier (C-RNTI). The C-RNTI is an identifier unique to the terminal device 1 and used for the identification in RRC connection and scheduling. The C-RNTI may be used for dynamically scheduled unicast transmission.

The RNTI may further include a Semi-Persistent Scheduling C-RNTI (SPS C-RNTI). The SPS C-RNTI is an identifier unique to the terminal device 1 and used for semi-persistent scheduling. The SPS C-RNTI may be used for semi-persistently scheduled unicast transmission.

The PDSCH is used for transmission of downlink data (DownLink Shared CHannel (DL-SCH)). The PDSCH is used to transmit a system information message. Here, the system information message may be cell-specific information (information unique to a cell). The system information is included in RRC signaling. The PDSCH is used to transmit the RRC signaling and the MAC control element.

The PMCH is used for transmission of multicast data (Multicast CHannel (MCH)).

In FIG. 1, the following downlink physical signals are used for downlink radio communication. Here, the downlink physical signals are not used to transmit the information output from the higher layers but is used by the physical layer.

Synchronization signal (SS)
DownLink Reference Signal (DL RS)

The Synchronization signal is used for the terminal device 1 to be synchronized to frequency and time domains in the downlink. In the TDD scheme, the Synchronization signal is mapped to subframes 0, 1, 5, and 6 within a radio frame. In the FDD scheme, the Synchronization signal is mapped to subframes 0 and 5 within a radio frame.

The Downlink Reference Signal is used for the terminal device 1 to perform channel compensation on a downlink physical channel. The downlink reference signal is used in order for the terminal device 1 to obtain the downlink channel state information.

According to the present embodiment, the following five types of Downlink Reference Signals are used.

Cell-specific Reference Signal (CRS)
UE-specific Reference Signal (URS) associated with the PDSCH
Demodulation Reference Signal (DMRS) associated with the EPDCCH
Non-Zero Power Channel State Information-Reference Signal (NZP CSI-RS)
Zero Power Channel State Information-Reference Signal (ZP CSI-RS)
Multimedia Broadcast and Multicast Service over Single Frequency Network Reference Signal (MBSFN RS)
Positioning Reference Signal (PRS)

Here, the downlink physical channel and the downlink physical signal are collectively referred to as a downlink signal. The uplink physical channel and the uplink physical signal are collectively referred to as an uplink signal. The downlink physical channels and the uplink physical channels are collectively referred to as physical channels. The downlink physical signals and the uplink physical signals are collectively referred to as physical signals.

The BCH, the MCH, the UL-SCH, and the DL-SCH are transport channels. A channel used in the Medium Access Control (MAC) layer is referred to as a transport channel. A unit of the transport channel used in the MAC layer is also referred to as a Transport Block (TB) or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword and subject to coding processing on a codeword-by-codeword basis.

Now, carrier aggregation will be described in detail.

In the present embodiment, one or multiple serving cells may be configured for the terminal device 1. A technology in which the terminal device 1 communicates via multiple serving cells is referred to as cell aggregation or carrier aggregation. Here, the serving cells are also simply referred to as cells.

Here, the present invention may be applied to one serving cell or each of multiple serving cells configured for the terminal device 1. Furthermore, the present invention may be applied to one serving cell or some of multiple serving cells configured for the terminal device 1.

Here, a group of one or multiple serving cells may also be referred to as a cell group. In other words, the cell group may be a subset of the serving cells (e.g., a subset of the serving cells of a UE). The present embodiment may be applied to each cell group. Alternatively, the present embodiment may apply to a part of a cell group. For example, the cell groups may include a PUCCH cell group described below. Moreover, for example, the cell groups may include a master cell group and a secondary cell group in dual connectivity described below.

In the present embodiment, Time Division Duplex (TDD) and/or Frequency Division Duplex (FDD) may be applied. Here, for carrier aggregation, TDD or FDD may apply to one or all of the multiple serving cells. Alternatively, serving cells to which TDD applies and serving cells to which FDD applies may be aggregated. Here, a frame structure for FDD is also referred to as frame structure type 1. A frame structure for TDD is referred to as Frame structure type 2.

Here, for example, the one or multiple configured serving cells include one Primary Cell (PCell) and one or multiple Secondary Cells (SCells). The primary cell may be a serving cell in which an initial connection establishment procedure has been performed, a serving cell in which a connection re-establishment procedure has been initiated, or a cell indicated as the primary cell in a handover procedure. Here, at or after the point of time when an RRC connection is established, a secondary cell(s) may be configured.

Here, a carrier corresponding to a serving cell in the downlink is referred to as a downlink component carrier. A carrier corresponding to a serving cell in the uplink is referred to as an uplink component carrier. The downlink component carrier and the uplink component carrier are collectively referred to as a component carrier.

The terminal device 1 may simultaneously perform transmission and/or reception on multiple physical channels in one or multiple serving cells (component carrier(s)). Here, transmission of one physical channel may be performed in one serving cell (component carrier) of the multiple serving cells (component carriers).

For example, the base station device 3 and/or the terminal device 1 may support carrier aggregation of up to 32 downlink component carriers (downlink cells). In other words, the base station device 3 and/or the terminal device 1 can simultaneously perform transmission and/or reception on multiple physical channels in up to 32 serving cells. Here, the number of uplink component carriers may be less than the number of downlink component carriers.

Moreover, for example, the base station device 3 and/or the terminal device 1 may support carrier aggregation of up to 5 downlink component carriers (downlink cells). In other words, the base station device 3 and/or the terminal device 1 can simultaneously perform transmission and/or reception on multiple physical channels in up to 5 serving cells. Here, the number of uplink component carriers may be less than the number of downlink component carriers.

Here, the primary cell may be used for transmission on the PUCCH. Moreover, a contention based random access procedure may be performed on the primary cell. In other words, the primary cell may support the transmission on the PUCCH and/or the contention based random access (contention based random based access procedure).

Moreover, the primary cell is not deactivated. In other words, the primary cell is always activated. Moreover, cross carrier scheduling is not applied to the primary cell. In other words, the primary cell is always scheduled using the PDCCH in the primary cell.

Here, in the present embodiment, a secondary cell used for transmission on the PUCCH is referred to as a PUCCH secondary cell or a special secondary cell. Moreover, a secondary cell not used for transmission on the PUCCH is referred to as a non-PUCCH secondary cell, a non-special secondary cell, a non-PUCCH serving cell, or a non-PUCCH cell. Here, the PUCCH secondary cell(s) may be defined as a serving cell that is neither the primary cell nor a secondary cell.

To be more specific, the PUCCH secondary cell may be used for the transmission on the PUCCH. Moreover, the contention based random access procedure may be performed on the PUCCH secondary cell. In other words, the PUCCH secondary cell may support the transmission on the PUCCH and/or the contention based random access (contention based random based access procedure).

Here, the contention based random access procedure may not be performed on the PUCCH secondary cell. In other words, the PUCCH secondary cell may support the transmission on the PUCCH, and may not support the contention based random access (contention based random access procedure).

Moreover, as will be described later, the PUCCH secondary cell may be activated and/or deactivated. Moreover, the cross carrier scheduling may not be applied to the PUCCH secondary cell. In other words, the PUCCH secondary cell may always be scheduled using the PDCCH in the PUCCH secondary cell. Here, the cross carrier scheduling may be applied to the PUCCH secondary cell. In other words, the PUCCH secondary cell may be scheduled using the PDCCH in another serving cell.

Here, the base station device 3 may configure a cell group associated with dual connectivity (e.g., a master cell group and/or a secondary cell group) for the terminal device 1. For example, the base station device 3 may configure the cell group associated with dual connectivity using information (parameters) included in higher layer signaling.

Here, in the dual connectivity, the master cell group may include the primary cell. Moreover, in the dual connectivity, the secondary cell group may include the primary secondary cell. Here, for operations relating to the dual connectivity, the primary cell in the master cell group and/or the primary secondary cell in the secondary cell group is also referred to as a special cell.

Here, the special cell (the primary cell of the master cell group and/or the primary secondary cell of the secondary cell group in the dual connectivity) may be used for transmission on the PUCCH. Moreover, the contention based random access procedure may be performed on the special cell. In other words, the special cell may support the transmission on the PUCCH and/or the contention based random access (contention based random based access procedure).

In the dual connectivity, the primary cell is not deactivated. In other words, the primary cell is always activated. In the dual connectivity, the primary secondary cell is not deactivated. In other words, the primary secondary cell is always activated.

Moreover, in the dual connectivity, the cross carrier scheduling is not applied to the primary cell. In other words, the primary cell is always scheduled using the PDCCH in the primary cell. Moreover, in the dual connectivity, the cross carrier scheduling is not applied to the primary secondary cell. In other words, the primary secondary cell is always scheduled using the PDCCH in the primary secondary cell. Here, in the dual connectivity, the cross carrier scheduling may be used only for the serving cells in the same cell group.

Moreover, in the dual connectivity, the terminal device 1 may (simultaneously) connect to a Master eNB (MeNB) and a secondary eNB (SeNB). In a case that a cell group associated with the dual connectivity is configured, two MAC entities may be configured for the terminal device 1. Here, one of the two MAC entities may indicate a MAC entity for the master cell group. The other of the two MAC entities may indicate a MAC entity for the secondary cell group. In a case that the dual connectivity is not configured, one MAC entity may be configured for the terminal device 1.

In other words, in a case that the cell group associated with the dual connectivity is configured, each of a first MAC processing unit corresponding to the master cell group and a second MAC processing unit corresponding to the secondary cell group in the terminal device 1 may perform processing (for example, a part or all of the processing relating to the transmit power described below). Moreover, in a case that the cell group associated with the dual connectivity is not configured, a single MAC processing unit (for example, the first MAC processing unit corresponding to the master cell group or the second MAC processing unit corresponding to the secondary cell group) in the terminal device 1 may perform processing (for example, a part or all of the processing relating to the transmit power, described below).

For example, each MAC entity may be configured by RRC with a serving cell supporting the transmission on the PUCCH and/or the contention based random access (contention based random access procedure). Here, the special cell may be one of the primary cell in the master cell group and the primary secondary cell in the secondary cell group, depending on whether the MAC entity is associated with the master cell group or the secondary cell group.

Here, in the present embodiment, the primary cell, the PUCCH secondary cell, and/or the special cell are collectively referred to as a PUCCH serving cell or a PUCCH cell. Moreover, the secondary cell may not include a primary secondary cell. Moreover, the master cell group may include one or multiple PUCCH cell groups described below. Moreover, the secondary cell group may include one or multiple PUCCH cell groups described below.

Here, the PUCCH serving cell may always include the downlink component carrier and the uplink component carrier. Moreover, as described above, the PUCCH resources may be configured in the PUCCH serving cell. In other words, the base station device 3 may transmit information used to configure the PUCCH resources in the PUCCH serving cell to the terminal device 1.

To be specific, the base station device 3 may transmit information used to configure the PUCCH resources in the primary cell to the terminal device 1. Moreover, the base station device 3 may transmit information used to configure the secondary cell with the PUCCH resources (PUCCH secondary cell) to the terminal device 1. Moreover, in the dual connectivity, the base station device 3 may transmit information used to configure the PUCCH resources in the primary cell of the master cell group to the terminal device 1. Moreover, in the dual connectivity, the base station device 3 may transmit information used to configure the PUCCH resources in the primary secondary cell of the secondary cell group to the terminal device 1.

Here, the non-PUCCH serving cell (non-PUCCH secondary cell) may include only the downlink component carrier. Moreover, the non-PUCCH serving cell may include a downlink component carrier and an uplink component carrier.

Here, the base station device 3 may configure one or multiple serving cells by using higher layer signaling. For example, one or multiple secondary cells may be configured to form a set of multiple serving cells with the primary cell. Here, the serving cells configured by the base station device 3 may include a PUCCH serving cell.

Moreover, the PUCCH serving cell (primary cell, PUCCH secondary cell, and/or special cell) may be configured by the base station device 3. For example, the base station device 3 may transmit higher layer signaling that includes information (index) used to configure the PUCCH serving cell (primary cell, PUCCH secondary cell, and/or special cell).

The base station device 3 may activate or deactivate one or multiple serving cells by using higher layer signaling (e.g., the MAC control element). For example, the activation or deactivation mechanism may be based on a combination of the MAC control element and a deactivation timer.

Here, secondary cells activated or deactivated by the base station device 3 may include the above-described PUCCH secondary cell. To be specific, the base station device 3 may solely activate or deactivate multiple secondary cells including the PUCCH secondary cell by using a single activation/deactivation command. In other words, the base station device 3 may transmit the single activation/deactivation command to be used to activate or deactivate secondary cells by using the MAC control element.

As a value for the deactivation timer, a common value may be set for each terminal device 1 by the higher layers (e.g., the RRC layer). The deactivation timer (the value of the timer) may be maintained for (apply to) each of the secondary cells. Here, the deactivation timer (the value of the timer) may be maintained for each of the non-PUCCH secondary cells only. In other words, the terminal device 1 may maintain (apply) the deactivation timer for (to) each of the non-PUCCH secondary cells only, without applying the deactivation timer to the PUCCH secondary cells.

Alternatively, a deactivation timer for PUCCH secondary cells and a deactivation timer for non-PUCCH secondary cells may be configured separately. For example, the base station device 3 may transmit higher layer signaling including the deactivation timer for the PUCCH secondary cells and information on the configuration of the deactivation timer. Moreover, the base station device 3 may transmit higher layer signaling including the deactivation timer for the non-PUCCH secondary cells and information on the configuration of the deactivation timer.

Figure 2B:
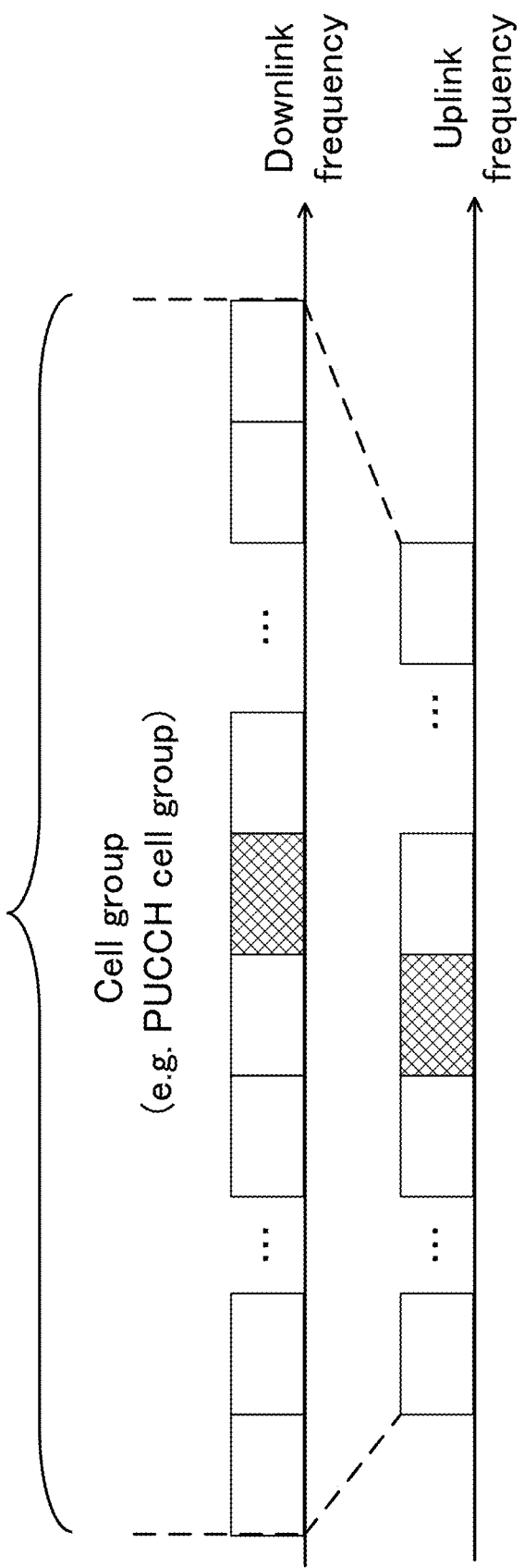

FIG. 2A to FIG. 2C are diagrams illustrating cell groups according to the present embodiment. Here, FIG. 2A to FIG. 2C respectively illustrate three examples (Example (a), Example (b), and Example (c)) as examples of a configuration (constitution or definition) of a cell group. Here, FIG. 2A to FIG. 2C illustrate a PUCCH cell group by way of example, but the present embodiment is applicable to cell groups different from the PUCCH cell group. For example, the present embodiment is applicable to cell groups associated with the dual connectivity.

Moreover, for example, the base station device 3 may configure one or multiple groups of serving cells corresponding to the serving cell indicated using the Carrier Indicator Field (CIF). In other words, the base station device 3 may configure one or multiple groups of serving cells in association with the downlink transmission. Furthermore, the base station device 3 may configure one or multiple serving cells in association with the uplink transmission. Moreover, the present embodiment is applicable to such cell groups.

Here, for example, the cell group may be configured by the base station device 3. In other words, the base station device 3 may transmit information (or index or cell group index) that may be used to configure the cell group. For example, the base station device 3 may transmit the higher layer signaling that includes information used to configure the cell group.

FIG. 2A illustrates that a first cell group and a second cell group are configured as a cell group (e.g., a PUCCH cell group). For example, in FIG. 2A, the base station device 3 may transmit a downlink signal in the first cell group, and the terminal device 3 may transmit an uplink signal in the first cell group. In other words, the terminal device 1 may transmit the uplink control information on the PUCCH in the first cell group. To be specific, the PUCCH cell group may be a group associated with transmission on the PUCCH (transmission of uplink control information on the PUCCH).

For example, in a case that 20 serving cells (downlink component carriers or downlink cells) are configured or activated in the first cell group, the base station device 3 and the terminal device 1 may transmit and/or receive uplink control information for the 20 downlink component carriers, respectively.

Similarly, the base station device 3 and the terminal device 1 may configure the cell group (e.g., the PUCCH cell group) as illustrated in FIG. 2B, and transmit and/or receive uplink control information to and from each other. Furthermore, the base station device 3 and the terminal device 1 may configure the cell group (e.g., the PUCCH cell group) as illustrated in FIG. 2C and transmit and/or receive the uplink control information to and from each other.

Here, one cell group may include at least one serving cell. Moreover, one cell group may include only one serving cell. Furthermore, for example, one PUCCH cell group may include one PUCCH serving cell and one or multiple non-PUCCH serving cells.

Here, cell groups including the primary cell may be referred to as primary cell groups. Furthermore, cell groups that do not include the primary cell are referred to as secondary cell groups. Moreover, PUCCH cell groups including the primary cell may be referred to as primary PUCCH cell groups. Moreover, PUCCH cell groups that do not include the primary cell may be referred to as secondary PUCCH cell groups. To be specific, the PUCCH secondary cell may be included in the PUCCH cell group.

Here, the base station device 3 may transmit information, to be used to indicate the PUCCH secondary cell, included in higher layer signaling and/or the PDCCH (downlink control information transmitted on the PDCCH). In other words, the terminal device 1 may determine the PUCCH secondary cell based on the information to be used to indicate the PUCCH secondary cell.

As described above, the PUCCH in the PUCCH serving cell may be used to transmit uplink control information for the serving cells included in the cell group to which the PUCCH serving cell belongs. In other words, the uplink control information for the serving cells included in the cell group may be transmitted using the PUCCH on the PUCCH serving cell included in the cell group.

Now, a method for calculating a transmit power value and a power headroom will be described in detail.

For example, in a case of performing a transmission on the PUSCH without simultaneously performing a transmission on the PUCCH, the terminal device 1 may set the transmit power value for a transmission on the PUSCH in a certain subframe i for a certain serving cell c, based on Expression (1). Here, $P_{real,c}(i)$ in Expression (1) may be defined based on Expression (2):

$$P_{PUSCH,c}(i)=\min\{P_{CMAX,c}(i),P_{real,c}(i)\} \ [dBm] \quad \text{Expression 1}$$

$$P_{real,c}(i)=10\log_{10}(M_{PUSCH,c}(i))+P_{O\_PUSCH,c}(j)+\alpha_c(j)\cdot PL_c+\Delta_{TF,c}(i)+f_c(i) \quad \text{Expression 2}$$

Here, $P_{real,c}(i)$ is a power value calculated (estimated) based on a real transmission for the PUSCH. Moreover, calculating (estimating) the power value based on a real transmission for the PUSCH refers to calculating (estimating) the power value based on a real transmission on the PUSCH.

Moreover, in a case of performing a transmission on the PUSCH while simultaneously performing a transmission on the PUCCH, the terminal device 1 may set the transmit power value for a transmission on the PUSCH in the certain subframe i for the certain serving cell c, based on Expression (3):

$$P_{PUSCH,c}(i)=\min\{10\log_{10}(p_{CMAX,c}(i)-p_{PUCCH,c}(i)), P_{real,c}(i)\} \ [dBm] \quad \text{Expression 3}$$

Here, $P_{PUSCH,c}(i)$ denotes a transmit power value for a transmission on the PUSCH in an i-th subframe. Moreover, min{X,Y} is a function used to select the minimum value of X and Y. Moreover, $P_{CMAX,c}$ denotes the maximum transmit power value (also referred to as the maximum output power value) and is configured by the terminal device 1.

Moreover, $P_{CMAX,c}$ denotes the linear value of $P_{CMAX,c}$. Moreover, $P_{PUCCH}$ denotes the linear value of $P_{PUCCH}(i)$. Here, $P_{PUCCH}(i)$ will be described below.

Moreover, $M_{PUSCH,c}$ denotes a PUSCH resource (e.g., bandwidth) allocated by the base station device 3 and is expressed by the number of resource blocks. Moreover, $P_{O\_PUSCH,c}$ is a parameter indicative of transmit power on which the transmission on the PUSCH is based. For example, $P_{O\_PUSCH,c}$ is constituted of the sum of a self-specific parameter $P_{O\_NOMICAL\_PUSCH,c}$ indicated by a higher layer and a user-equipment-specific parameter $P_{O\_UE\_PUSCH,c}$ indicated by the higher layer.

For example, the base station device 3 may transmit information used to indicate $P_{O\_PUSCH,c}$ to the terminal device 1 using higher layer signaling. The base station device 3 may configure the cell-specific parameter $P_{O\_NOMICAL\_PUSCH,c}$ and/or the user-equipment-specific parameter $P_{O\_UE\_PUSCH,c}$ using the higher layer signaling.

Moreover, $PL_c$ denotes an estimation of a path loss in the downlink for a certain serving cell, and the estimation may be calculated in the terminal device 1.

Moreover, $\alpha_c$ denotes a coefficient by which the path loss is multiplied, and is indicated by a higher layer. For example, the base station device 3 may transmit information used to indicate $\alpha_c$ to the terminal device 1 using the higher layer signaling.

Moreover, $\Delta T_{F,c}(i)$ denotes an offset value based on a modulation scheme or the like. Moreover, a PUSCH power control adjustment state of the current transmission on the PUSCH is given by $f_c(i)$. Here, whether accumulation for $f_c(i)$ is enabled or disabled is indicated by the higher layer based on a parameter (Accumulation-enabled).

For example, in a case that the accumulation is enabled based on the parameter (Accumulation-enabled) provided by the higher layer, the terminal device 1 sets the value of fc(i) based on Expression (4):

$$f_c(i)=f_c(i-1)+\delta_{PUSCH,c}(i-K_{PUSCH}) \text{ if accumulation is enabled} \quad \text{Expression 4}$$

Here, $\delta_{PUSCH,c}$ is a correction value and is referred to as a TPC command. In other words, in a case that the accumulation is enabled based on the parameter (Accumulation-enabled) provided by the higher layer, $\delta_{PUSCH,c}(i-K_{PUSCH,c})$ denotes a value accumulated in fc(i-1). Here, $\delta$PUSCH,c $(i-K_{PUSCH,c})$ is indicated based on a value set in a field (2-bit information filed) of a TPC command for the PUSCH included in uplink grant for a certain serving cell, which is received in a certain subframe (i-KPUSCH).

Moreover, in a case that the accumulation is disabled based on the parameter (Accumulation-enabled) provided by the higher layer (in other words, the accumulation is not enabled), the terminal device 1 sets the value of $f_c(i)$ based on Expression (5):

$$f_c(i)=\delta_{PUSCH,c}(i-K_{PUSCH}) \text{ if accumulation is not enabled} \quad \text{Expression 5}$$

In other words, in a case that the accumulation is disabled based on the parameter (Accumulation-enabled) provided by the higher layer, $\delta_{PUSCH,c}(i-K_{PUSCH})$ denotes an absolute value for $f_c(i)$. For example, the value to which the field (2-bit information field) of the TPC command for the PUSCH included in the uplink grant (DCI format 0 or DCI format 4) is set is mapped to an absolute value {-4, -1, 1, 4}.

Moreover, in a case of performing a transmission on the PUCCH, the terminal device 1 sets the transmit power value for a transmission on the PUCCH in the certain subframe i for the certain serving cell c, based on Expression (6): Here, $P_{real\_PUCCH,c}(i)$ in Expression (6) is defined based on Expression (7):

$$P_{PUCCH,c}(i)=\min\{P_{CMAX,c}, P_{real\_PUCCH,c}(i)\} \text{ [dBm]} \quad \text{Expression 6}$$

$$P_{real\_PUCCH,c}(i)=P_{O\_PUCCH,c}+PL_c+h(n_{CQI},n_{HARQ})+\Delta_{F\_PUCCH}(F)+g(i) \quad \text{Expression 7}$$

Here, $P_{real\_PUCCH,c}(i)$ is a power value calculated (estimated) based on a real transmission for the PUCCH. Moreover, calculating (estimating) the power value based on a real transmission for the PUCCH refers to calculating (estimating) the power value based on a real transmission on the PUCCH.

Moreover, $P_{PUCCH,c}(i)$ denotes a transmit power value for a transmission on the PUCCH in the i-th subframe. Moreover, $P_{O\_PUCCH,c}$ is a parameter indicative of transmit power on which the transmission on the PUCCH is based, and is indicated by the higher layer.

Moreover, $h(n_{CQI}, n_{HARQ})$ is a value calculated based on the number of bits transmitted on the PUCCH and a PUCCH format. Here, $n_{CQI}$ denotes channel state information transmitted on the PUCCH, and $n_{HARQ}$ denotes information (e.g., ACK/NACK) on the HARQ transmitted on the PUCCH.

Moreover, $\Delta_{F\_PUCCH}(F)$ is an offset value indicated for each PUCCH format by the higher layer. For example, $\Delta_{F\_PUCCH}(F)$ for a PUCCH format 1a is always 0. Moreover, the terminal device 1 may set the value of g(i) based on Expression (8):

$$g(i)=g(i-1)+\delta_{PUCCH}(i-K_{PUCCH}) \quad \text{Expression 8}$$

Here, $\delta_{PUCCH}$ is a correction value and is referred to as a TPC command. In other words, $\delta_{PUCCH}(i-K_{PUCCH})$ denotes a value accumulated in g(i-1). Moreover, δPUSCH(i-KPUCCH) is indicated based on a value set in a field of a TPC command for the PUCCH included in downlink assignment for a certain serving cell, which is received in a certain subframe $(i-K_{PUCCH})$. For example, the value to which the field (2-bit information field) of the TPC command for the PUCCH included in the downlink assignment is set is mapped to an accumulated correction value {-1, 0, 1, 3}.

Now, Power Headroom Reporting (PHR) will be described in detail.

The terminal device 1 transmits, to the base station device 3, a power headroom (power margin value) indicative of a difference between the maximum transmit power and prescribed power estimated for a transmission in the uplink. In other words, the power headroom reporting is used to provide the base station device 3 with a difference between the maximum transmit power (also referred to as the nominal maximum transmission power) and power estimated for a transmission on the UL-SCH (or the PUSCH is also applicable) for each activated serving cell.

In other words, the power headroom reporting is used to provide the base station device 3 with information on the degree of a margin between the maximum transmit power and power used by the terminal device 1 to perform a transmission on the PUSCH. Here, the power headroom reporting may be used to provide the base station device 3 with a difference between the maximum transmit power and power estimated for a transmission on the UL-SCH (or the PUSCH is also applicable) and the PUCCH. Moreover, the power headroom reporting may be used to provide the maximum transmit power value to the base station device 3. Moreover, the power headroom is provided from the physical layer to a higher layer and reported to the base station device 3.

For example, the base station device 3 determines a resource allocation for the PUSCH (e.g., the bandwidth), the modulation scheme for the PUSCH, and the like base on the value of the power headroom.

Two types (type 1 and type 2) are defined for the power headroom reporting. Here, a certain power headroom is effective for the certain subframe i for the certain serving cell c. The type 1 power headroom includes a type 1-1 power headroom, a type 1-2 power headroom, and a type 1-3 power headroom. Moreover, the type 2 power headroom includes a type 2-1 power headroom, a type 2-2 power headroom, a type 2-3 power headroom, and a type 2-4 power headroom. The type 1 power headroom and the type 2 power headroom are hereinafter also simply referred to as a power headroom.

Here, the type 1-1 power headroom is defined for a case where the terminal device 1 performs a transmission on the PUSCH without simultaneously performing a transmission on the PUCCH in the certain subframe i for the certain serving cell c. Here, reporting of the type 1-1 power headroom is defined for the certain serving cell c.

For example, in a case of performing a transmission on the PUSCH without simultaneously performing a transmission on the PUCCH in the certain subframe i for the certain cell c, the terminal device 1 may calculate the type 1-1 power headroom for a transmission on the PUSCH in the certain subframe i based on Expression (9):

$$PH_{type1,c}(i)=P_{CMAX,c}(i)-P_{real,c}(i) \text{ [dB]} \quad \text{Expression 9}$$

In other words, the type 1-1 power headroom is calculated based on a real transmission for the PUSCH. Here, calculating (estimating) the power headroom based on a real transmission for the PUSCH refers to calculating the power headroom based on a real transmission on the PUSCH.

Moreover, the reporting of the type 1-2 power headroom is defined for a case where the terminal device 1 performs a transmission on the PUSCH while simultaneously performing a transmission on the PUCCH, in the certain subframe i for the certain serving cell c. Here, reporting of the type 1-2 power headroom is defined for the certain serving cell c.

For example, in a case of performing a transmission on the PUSCH while simultaneously performing a transmission on the PUCCH, in the certain subframe i for the certain serving cell c, the terminal device 1 calculates the type 1-2 power headroom for a transmission on the PUSCH in the certain subframe i based on Expression (10):

$$PH_{type1,c}(i)=P_{CMAX\_A,c}(i)-P_{real,c}(i) \text{ [dB]} \quad \text{Expression 10}$$

In other words, the type 1-2 power headroom is calculated based on a real transmission for the PUSCH. Here, $P_{CMAX\_A}$ is the maximum transmit power value calculated on the assumption that a transmission is performed only on the PUSCH in the certain subframe i. In this case, the physical layer provides the higher layer with $P_{CMAX\_A}$ instead of $P_{CMAX}$.

Moreover, the reporting of the type 1-3 power headroom is defined for a case where the terminal device 1 performs no transmission on the PUSCH in the certain subframe i for the certain serving cell c. Here, the reporting of the type 1-3 power headroom is defined for the certain serving cell c.

For example, in a case of performing no transmission on the PUSCH in the certain subframe i for the certain serving cell c, the terminal device 1 calculates the type 1-3 power headroom for a transmission on the PUSCH in the certain subframe i based on Expression (11). Here, $P_{reference,c}(i)$ in Expression (11) may be defined based on Expression (12):

$$PH_{type1,c}(i)=P_{CMAX\_B,c}(i)-P_{reference,c}(i) \quad \text{Expression 11}$$

$$P_{reference,c}(i)=P_{O\_PUSCH,c}(1)+\alpha_c(1)\cdot PL_c+f_c(i) \quad \text{Expression 12}$$

Here, $P_{CMAX\_B}$ is calculated on the assumption that Maximum Power Reduction (MPR)=0 dB, Additional Maximum Power Reduction (A-MPR)=0 dB, Power management Maximum Power Reduction (P-MPR)=0 dB, and $\Delta T_C$=0 dB. Here, MPR, A-MPR, P-MPR, and $\Delta T_C$ are parameters used to set the value of PCMAX and c.

In other words, the type 1-3 power headroom is calculated based on a reference format for the PUSCH. Here, calculating the power headroom based on the reference format for the PUSCH refers to calculating the power headroom based on a transmission on the PUSCH using the reference format.

Moreover, $P_{reference,c}(i)$ is a power value calculated (estimated) based on the reference format for the PUSCH. Moreover, calculating (estimating) the power value based on the reference format for the PUSCH refers to calculating (estimating) the power value on the assumption of a transmission on the PUSCH using the reference format.

In other words, a transmission on the PUSCH using the MPUSCH in the certain subframe i and c=1 is assumed as the reference format for the PUSCH. Moreover, $P_{O\_PUSCH,c}(1)$ is assumed as the reference format for the PUSCH. Alternatively, $\alpha_c(1)$ is assumed as the reference format for the PUSCH. Alternatively, $\Delta_{TF}(i)$=0 is assumed as the reference format for the PUSCH.

Here, the reporting of the type 2-1 power headroom is defined for a case where the terminal device 1 performs a transmission on the PUSCH while simultaneously performing a transmission on the PUCCH, in the certain subframe i with respect to the certain serving cell c. Here, the reporting of the type 2-1 power headroom is defined for the certain serving cell c.

For example, in a case of performing a transmission on the PUSCH while simultaneously performing a transmission on the PUCCH, in the certain subframe i for the certain serving cell c, the terminal device 1 calculates the type 2-1 power headroom for a transmission on the PUSCH in the certain subframe i based on Expression (13):

$$PH_{type2,c}(i)=P_{CMAX,c}(i)-10\log_{10}(10^{P_{real,c}(i)/10}+10^{P_{real\_PUCCH,c}(i)/10})\ [dB] \quad \text{Expression 13}$$

In other words, the type 2-1 power headroom is calculated based on a real transmission for the PUSCH and a real transmission for the PUCCH.

Moreover, the reporting of the type 2-2 power headroom is defined for a case where the terminal device 1 performs a transmission on the PUSCH without simultaneously performing a transmission on the PUCCH, in the certain subframe i for the certain serving cell c. Here, the reporting of the type 2-2 power headroom is defined for the certain serving cell c.

For example, in a case of performing a transmission on the PUSCH without performing a transmission on the PUCCH, in the certain subframe i for the certain serving cell c, the terminal device 1 calculates the type 2-2 power headroom for a transmission on the PUSCH in the certain subframe i based on Expression (14). Here, $P_{reference\_PUCCH,c}(i)$ in Expression (14) may be defined based on Expression (15):

$$PH_{type2,c}(i)=P_{CMAX,c}(i)-10\log_{10}(10^{P_{real,c}(i)/10}+10^{P_{reference\_PUCCH,c}(i)/10})[dB] \quad \text{Expression 14}$$

$$P_{reference\_PUCCH,c}(i)=P_{O\_PUCCH,c}+PL_c+g(i) \quad \text{Expression 15}$$

In other words, the type 2-2 power headroom is calculated based on a real transmission for the PUSCH and the reference format for the PUCCH. Here, calculating the power headroom based on the reference format for the PUCCH refers to calculating the power headroom on the assumption of a transmission on the PUCCH using the reference format.

Moreover, $P_{reference\_PUCCH,c}(i)$ is a power value calculated (estimated) based on the reference format for the PUCCH. Here, calculating (estimating) the power value based on the reference format for the PUCCH refers to calculating (estimating) the power value on the assumption of a transmission on the PUCCH using the reference format.

In other words, $h(n_{CQI}, n_{HARQ})$=0 is assumed as the reference format for the PUCCH. Alternatively, $\Delta_{F\_PUCCH(F)}$=0 is assumed as the reference format for the PUSCH. Alternatively, a PUCCH format 1a is assumed as the reference format for the PUCCH.

Moreover, the reporting of the type 2-3 power headroom is defined for a case where the terminal device 1 performs a transmission on the PUCCH without simultaneously performing a transmission on the PUSCH, in the certain subframe i for the certain serving cell c. Here, the reporting of the type 2-3 power headroom is defined for the certain serving cell c.

For example, in a case of performing a transmission on the PUCCH without performing a transmission on the PUSCH, in the certain subframe i for the certain serving cell c, the terminal device 1 calculates the type 2-3 power headroom for a transmission on the PUSCH in the certain subframe i based on Expression (16):

$$PH_{type2,c}(i)=P_{CMAX,c}(i)-10\log_{10}(10^{P_{reference}(i)/10}+10^{P_{real\_PUCCH,c}(i)/10})\ [dB] \quad \text{Expression 16}$$

In other words, the type 2-3 power headroom is calculated based on the reference format for the PUSCH and a real transmission for the PUCCH.

Moreover, the reporting of the type 2-4 power headroom is defined for a case where the terminal device 1 performs no transmission on the PUCCH or on the PUSCH, in the certain subframe i for the certain serving cell c. Here, the reporting of the type 2-4 power headroom is defined for the certain serving cell c.

For example, in a case of performing no transmission on the PUCCH or on the PUSCH, in the certain subframe i for the certain serving cell c, the terminal device 1 calculates the type 2-4 power headroom for a transmission on the PUSCH in the certain subframe i based on Expression (17):

$$PH_{type2,c}=P_{CMAX\_B,c}(i)-10\log_{10}(10^{P_{reference,c}(i)/10}+10^{P_{reference\_PUCCH,c}(i)/10}) \quad \text{Expression 17}$$

In other words, the type 2-4 power headroom is calculated based on the reference format for the PUSCH and the reference format for the PUCCH.

Here, a MAC CE structure of the MAC control element used to report the power headroom will be described in detail.

Examples of the MAC control element used to report the power headroom may include a Power Headroom MAC control element, an Extended Power Headroom MAC control element, a secondary cell (Scell) PUCCH Power Headroom MAC control element, and/or Dual connectivity Power Headroom MAC control element.

The Extended Power Headroom MAC control element is hereinafter also referred to as a first MAC control element. Moreover, the secondary cell (Scell) PUCCH Power Headroom MAC control element is hereinafter also referred to as a second MAC control element. Moreover, the Dual connectivity Power Headroom MAC control element is hereinafter also referred to as a third MAC control element.

Here, the base station device 3 may transmit information (extended-PHR) used to indicate that the power headroom is to be reported using the first MAC control element. In other words, the terminal device 1 may report the power headroom using the first MAC control element in a case that the information (extended-PHR) used to indicate that the power headroom is to be reported using the first MAC control element is configured. Here, the information (extended-PHR) used to indicate that the power headroom is to be reported using the first MAC control element is hereinafter also referred to as a first parameter.

Moreover, the base station device 3 may transmit information (ScellPUCCH-PHR) used to indicate that the power headroom is to be reported using the second MAC control element. In other words, the terminal device 1 may report the power headroom using the second MAC control element, in a case that the information (ScellPUCCH-PHR) used to indicate that the power headroom is to be reported using the second MAC control element is configured. The information (ScellPUCCH-PHR) used to indicate that the power headroom is to be reported using the second MAC control element is hereinafter also referred to as a second parameter.

Moreover, the base station device 3 may transmit information (dualconnectivity-PHR) used to indicate that the power headroom is to be reported using the third MAC control element. In other words, the terminal device 1 may report the power headroom using the third MAC control element, in a case that the information (dualconnectivity-PHR) used to indicate that the power headroom is to be reported using the third MAC control element is configured. The information (dualconnectivity-PHR) used to indicate that the power headroom is to be reported using the third MAC control element is hereinafter also referred to as a third parameter.

For example, the base station device 3 may always configure the second parameter to the terminal device 1, at least in a case that the PUCCH for the secondary cell is configured (in a case that the PUCCH secondary cell is configured). In other words, the terminal device 1 may always report the power headroom using the second MAC control element, at least in a case that the PUCCH for the secondary cell is configured (in a case that the PUCCH secondary cell is configured).

Moreover, the base station device 3 may always configure the third parameter in the terminal device 1, at least in a case that a cell group associated with the dual connectivity is configured (in a case that the dual connectivity is configured). In other words, the terminal device 1 may always report the power headroom using the third MAC control element, at least in a case that the cell group associated with the dual connectivity is configured (in a case that the dual connectivity is configured).

Here, the first parameter and the second parameter may not simultaneously be configured for the terminal device 1. Moreover, the second parameter and the third parameter may not simultaneously be configured for the terminal device 1. Moreover, the first parameter and the third parameter may not simultaneously be configured for the terminal device 1. Moreover, the first parameter, the second parameter, and the third parameter may not simultaneously be configured for the terminal device 1.

Furthermore, the first MAC control element, the second MAC control element, and the third MAC control element may be identified by using the value of a Logical Channel IDentifier (LCID). Here, the logical channel ID may be included in one MAC PDU subheader. In other words, the first MAC control element, the second MAC control element, and the third MAC control element may be identified by using one MAC PDU subheader including the logical channel ID.

For example, the first MAC control element may be identified by using a first value of the logical channel ID (which may be a first index corresponding to the value of the logical channel ID). Moreover, the second MAC control element may be identified by using a second value of the logical channel ID (which may be a second index corresponding to the value of the logical channel ID). Moreover, the third MAC control element may be identified by using a third value of the logical channel ID (which may be a third index corresponding to the value of the logical channel ID).

Here, the base station device 3 may transmit, to the terminal device 1, information (simultaneousPUCCH-PUSCH) used to indicate whether simultaneous transmission on the PUCCH and the PUSCH is configured. For example, the base station device 3 may transmit, to the terminal device 1, higher layer signaling including information used to indicate whether the simultaneous transmission on the PUCCH and the PUSCH is configured. The information used to indicate whether the simultaneous transmission on the PUCCH and the PUSCH is configured is hereinafter also referred to as a fourth parameter.

In other words, the terminal device 1 may perform the simultaneous transmission on the PUCCH and the PUSCH in a certain subframe, in a case that the simultaneous transmission on the PUCCH and the PUSCH is configured. Moreover, the terminal device 1 may perform a transmission on the PUCCH or a transmission on the PUSCH in a certain subframe, in a case that the simultaneous transmission on the PUCCH and on the PUSCH is not configured.

Here, the fourth parameter (a field for the fourth parameter) may be configured for the PUCCH serving cell. For example, the fourth parameter may be configured for the primary cell. Alternatively, the fourth parameter may be configured for the PUCCH secondary cell. Alternatively, the fourth parameter may be configured for the primary cell of the master cell group may in the dual connectivity. Alternatively, the fourth parameter may be configured for the primary secondary cell of the secondary cell group in the dual connectivity.

Here, the fourth parameter (the field for the fourth parameter) may be configured for each of the cell groups (may be configured for every cell group). For example, the fourth parameter may be configured for each of the PUCCH cell groups (may be configured for every PUCCH cell group). In other words, the fourth parameter may be configured for every cell group for which the PUCCH is configured. Alternatively, the fourth parameter may be configured for each of the master cell group and the secondary cell group in the dual connectivity.

Processing in the terminal device 1 according to the present embodiment will be described using FIG. 3, FIG. 4, and FIG. 5. Here, FIG. 3, FIG. 4, and FIG. 5 illustrate processing in a MAC entity in the terminal device 1 for description of the processing in the terminal device 1. Here, FIG. 3, FIG. 4, and FIG. 5 illustrate the processing in the MAC entity in the terminal device 1, but the processing illustrated in FIG. 3, FIG. 4, and FIG. 5 corresponds to the processing in the terminal device 1.

Moreover, the processing in the terminal device 1 is basically illustrated using FIG. 3, FIG. 4, and FIG. 5, but the base station device 3 performs similar processing in association with the processing in the terminal device 1. In other words, in association with the processing in the terminal device 1, the MAC entity in the base station device 3 may perform similar processing. Here, the processing in the MAC entity in the base station device 3 corresponds to the processing in the base station device 3. For example, a reception of the power headroom reporting by the MAC entity in the base station device 3 is similar to a reception of the power headroom reporting by the base station device 3. In other words, reception of the power headroom reporting by the MAC entity in the base station device 3 is similar to reception of the power headroom reporting by a reception unit of the base station device 3

Moreover, as illustrated in FIG. 3, FIG. 4, and FIG. 5, the MAC entity in the terminal device 1 may perform the processing illustrated in FIG. 3, FIG. 4, and FIG. 5 in a case that the MAC entity has an uplink resource for a new transmission in a certain Transmission Time Interval (TTI) (the uplink resource is allocated by the base station device 3). Here, the certain TTI may correspond to the certain subframe i. For example, the certain TTI (certain subframe i) may be 1 ms. Here, the MAC entity may be included in a MAC processing unit (first MAC processing unit and/or second MAC processing unit).

Moreover, the MAC entity may obtain the above-described power headroom. For example, the MAC entity may indicate that the first MAC control element, the second MAC control element, and/or the third MAC control element is to be generated and transmitted based on the above-described value of the power headroom (more specifically, the value of the power headroom reported by the physical layer).

FIG. 3 is still another diagram illustrating the operation in the terminal device 1 according to the present embodiment.

As illustrated in FIG. 3, the terminal device 1 may obtain the value of the type 2 power headroom for the primary cell in a case that the first parameter is configured and the simultaneous transmission on the PUCCH and the PUSCH is configured. In other words, the terminal device 1 may obtain the value of the type 2 power headroom for the primary cell in a case that the first parameter is configured and the simultaneous transmission on the PUCCH and the PUSCH is configured for the primary cell. Here, in this case, the second parameter may not be configured. Moreover, in this case, the third parameter may not be configured.

Moreover, the terminal device 1 may obtain the value of the type 2 power headroom for the primary cell in a case that the second parameter is configured. In other words, in this case, the terminal device 1 may obtain the value of the type 2 power headroom for the primary cell regardless of whether the simultaneous transmission on the PUCCH and the PUSCH is configured (for example, regardless of whether the simultaneous transmission on the PUCCH and the PUSCH is configured for the primary cell).

Moreover, the terminal device 1 may obtain the value of the type 2 power headroom for the secondary cell configured with the PUCCH resource, in a case that the second parameter is configured and the PUCCH resource for the secondary cell is configured (in other words, the PUCCH secondary cell is configured) and the secondary cell configured with the PUCCH resource is activated. In other words, in this case, the terminal device 1 may obtain the value of the type 2 power headroom for the primary cell regardless of whether the simultaneous transmission on the PUCCH and the PUSCH is configured (for example, regardless of whether the simultaneous transmission on the PUCCH and the PUSCH is configured for the primary cell). Here, in this case, the first parameter may not be configured.

Moreover, the terminal device 1 may obtain the value of the type 2 power headroom for the primary cell (in FIG. 3, the primary cell is illustrated as Spcell (special cell)) in a case that the third parameter is configured and the simultaneous transmission on the PUCCH and the PUSCH is configured. In other words, the terminal device 1 may obtain the value of the type 2 power headroom for the primary cell in a case that the third parameter is configured and the simultaneous transmission on the PUCCH and the PUSCH is configured for the primary cell. Here, in this case, the first parameter may not be configured. Moreover, in this case, the second parameter may not be configured.

Here, the MAC entity obtaining the value of the type 2 power headroom for the primary cell may be a MAC entity corresponding to the master cell group including the primary cell in the dual connectivity (for example, a first MAC entity or first MAC processing unit).

Moreover, the terminal device 1 may obtain the value of the type 2 power headroom for the primary secondary cell (in FIG. 3, the primary secondary cell is illustrated as SpCell of the other MAC entity (the special cell of the other MAC entity)) in a case that the third parameter is configured. In other words, in this case, the terminal device 1 may obtain the value of the type 2 power headroom for the primary secondary cell regardless of whether the simultaneous transmission on the PUCCH and the PUSCH is configured (for example, regardless of whether the simultaneous transmission on the PUCCH and the PUSCH is configured for the primary secondary cell).

Here, the MAC entity obtaining the value of the type 2 power headroom for the primary secondary cell may be a MAC entity corresponding to the secondary cell group including the primary secondary cell in the dual connectivity (for example, a second MAC entity or second MAC processing unit). In other words, the other MAC entity may be a MAC entity that is not a MAC entity having obtained the value of the type 2 power headroom for the primary cell, in a case that the third parameter is configured and the simultaneous transmission on the PUCCH and the PUSCH is configured.

In other words, the MAC entity obtaining the value of the type 2 power headroom for the primary secondary cell may be a MAC entity corresponding to the secondary cell group including the primary secondary cell in a case that the third parameter is configured and the simultaneous transmission on the PUCCH and the PUSCH is configured, and in a case that the MAC entity having obtained the value of the type 2 power headroom for the primary cell is a MAC entity corresponding to the master cell including the primary cell.

Moreover, the MAC entity obtaining the value of the type 2 power headroom for the primary secondary cell may be a MAC entity corresponding to the master cell group including the primary cell in a case that the third parameter is configured and the simultaneous transmission on the PUCCH and the PUSCH is configured, and in a case that the MAC entity having obtained the value of the type 2 power headroom for the primary cell is a MAC entity corresponding to the secondary cell group including the primary secondary cell.

FIG. 4 is another diagram illustrating operations in the terminal device 1 according to the present embodiment.

As illustrated in FIG. 4, the terminal device 1 may obtain the value of the type 2 power headroom for the primary cell, in a case that the first parameter is configured and the PUCCH resource for the secondary cell is configured (for example, the PUCCH secondary cell is configured). In other words, in this case, the terminal device 1 may obtain the type 2 power headroom for the primary cell regardless of whether the simultaneous transmission on the PUCCH and the PUSCH is configured (for example, regardless of whether the simultaneous transmission on the PUCCH and the PUSCH is configured for the primary cell). Here, in this case, the second parameter may not be configured. Moreover, in this case, the third parameter may not be configured.

Moreover, the terminal device 1 may obtain the value of the type 2 power headroom for the secondary cell configured with the PUCCH resource, in a case that the first parameter is configured and the PUCCH resource for the secondary cell is configured and the secondary cell configured with the PUCCH resource is activated. In other words, in this case, the terminal device 1 may obtain the value of the type 2 power headroom for the secondary cell configured with the PUCCH resource, regardless of whether the simultaneous transmission on the PUCCH and the PUSCH is configured (for example, regardless of whether the simultaneous transmission on the PUCCH and the PUSCH is configured for the secondary cell configured with the PUCCH resource).

Moreover, the terminal device 1 may obtain the type 2 power headroom for the primary cell, in a case that the first parameter is configured and the simultaneous transmission on the PUCCH and the PUSCH is configured. In other words, the terminal device 1 may obtain the type 2 power headroom for the primary cell, in a case that the first parameter is configured and the PUCCH resource for the secondary cell is not configured and the simultaneous transmission on the PUCCH and the PUSCH is configured. In other words, the terminal device 1 may obtain the type 2 power headroom for the primary cell, in a case that the first parameter is configured and the PUCCH resource for the secondary cell is not configured and the simultaneous transmission on the PUCCH and the PUSCH is configured for the primary cell. Here, in this case, the second parameter may not be configured. Moreover, in this case, the third parameter may not be configured.

Moreover, the terminal device 1 may obtain the value of the type 2 power headroom for the primary cell (in FIG. 4, the primary cell is illustrated as Spcell (special cell)), in a case that the third parameter is configured and the simultaneous transmission on the PUCCH and the PUSCH is configured. In other words, the terminal device 1 may obtain the value of the type 2 power headroom for the primary cell in a case that the third parameter is configured and the simultaneous transmission on the PUCCH and the PUSCH is configured for the primary cell. Here, in this case, the first parameter may not be configured. Moreover, in this case, the second parameter may not be configured.

Moreover, the terminal device 1 may obtain the value of the type 2 power headroom for the primary secondary cell (in FIG. 4, the primary secondary cell is illustrated as SpCell of the other MAC entity (the special cell of the other MAC entity)), in a case that the third parameter is configured. In other words, in this case, the terminal device 1 may obtain the value of the type 2 power headroom for the primary secondary cell regardless of whether the simultaneous transmission on the PUCCH and the PUSCH is configured (for example, regardless of whether the simultaneous transmission on the PUCCH and the PUSCH is configured for the primary secondary cell).

Here, the special cell and the special cell of the other MAC entity in FIG. 4 are similar to those in FIG. 3, and thus, description thereof is omitted.

FIG. 5 is still another diagram illustrating the operation in the terminal device 1 according to the present embodiment.

As illustrated in FIG. 5, the terminal device 1 may obtain the type 2 power headroom for the primary cell, in a case that the first parameter is configured and the simultaneous transmission on the PUCCH and the PUSCH is configured. In other words, the terminal device 1 may obtain the type 2 power headroom for the primary cell, in a case that the first parameter is configured and the simultaneous transmission on the PUCCH and the PUSCH is configured for the primary cell. Here, in this case, the second parameter may not be configured. Moreover, in this case, the third parameter may not be configured.

Moreover, the terminal device 1 may obtain the type 2 power headroom for the primary cell (in FIG. 4, the primary cell is illustrated as Spcell (special cell)), in a case that the third parameter is configured and the simultaneous transmission on the PUCCH and the PUSCH is configured. In other words, the terminal device 1 may obtain the type 2 power headroom for the primary cell, in a case that the first parameter is configured and the simultaneous transmission on the PUCCH and the PUSCH is configured for the primary cell. Here, in this case, the first parameter may not be configured. Moreover, in this case, the second parameter may not be configured.

Moreover, the terminal device 1 may obtain the value of the type 2 power headroom for the primary cell (in FIG. 5, the primary cell is illustrated as Spcell (special cell)), in a case that the third parameter is configured and PUCCH resource for the secondary cell is configured (i.e., the PUCCH secondary cell is configured). In other words, in this case, the terminal device 1 may obtain the type 2 power headroom for the primary cell regardless of whether the simultaneous transmission on the PUCCH and the PUSCH is configured (for example, regardless of whether the simultaneous transmission on the PUCCH and the PUSCH is configured for the primary cell). Here, in this case, the first parameter may not be configured. Moreover, in this case, the second parameter may not be configured.

Here, the terminal device 1 may obtain the value of the type 2 power headroom for the primary secondary cell (in FIG. 5, the primary secondary cell is illustrated as SpCell of the other MAC entity (the special cell of the other MAC entity)), in a case that the third parameter is configured and the two MAC entities are configured. In other words, in this case, the terminal device 1 may obtain the value of the type 2 power headroom for the primary secondary cell regardless of whether the simultaneous transmission on the PUCCH and the PUSCH is configured (for example, regardless of whether the simultaneous transmission on the PUCCH and the PUSCH is configured for the primary secondary cell).

Here, the special cell and the special cell of the other MAC entity in FIG. 5 are similar to those in FIG. 3, and thus, description thereof is omitted.

Moreover, the terminal device 1 may obtain the value of the type 2 power headroom for the secondary cell configured with the PUCCH resource, in a case that the third parameter is configured and the PUCCH resources for the secondary cell is configured (for example, the PUCCH secondary cell is configured). In other words, in this case, the terminal device 1 may obtain the value of the type 2 power headroom for the secondary cell configured with the PUCCH resource, regardless of whether the simultaneous transmission on the PUCCH and the PUSCH is configured (for example, regardless of whether the simultaneous transmission on the PUCCH and the PUSCH is configured for the secondary cell configured with the PUCCH resource).

Moreover, the terminal device 1 may obtain the value of the type 2 power headroom for the secondary cell configured with the PUCCH resource, in a case that the third parameter is configured and the PUCCH resource for the secondary cell is configured and the secondary cell configured with the PUCCH resource is activated. In other words, in this case, the terminal device 1 may obtain the value of the type 2 power headroom for the secondary cell configured with the PUCCH resource, regardless of whether the simultaneous transmission on the PUCCH and the PUSCH is configured (for example, regardless of whether the simultaneous transmission on the PUCCH and the PUSCH is configured for the secondary cell configured with the PUCCH resource).

In other words, one MAC entity in the terminal device 1 may obtain the type 2 power headroom for the primary cell and the type 2 power headroom for the secondary cell regardless of whether the fourth parameter is configured.

Configurations of devices according to the present embodiment will be described below.

Figure 6:
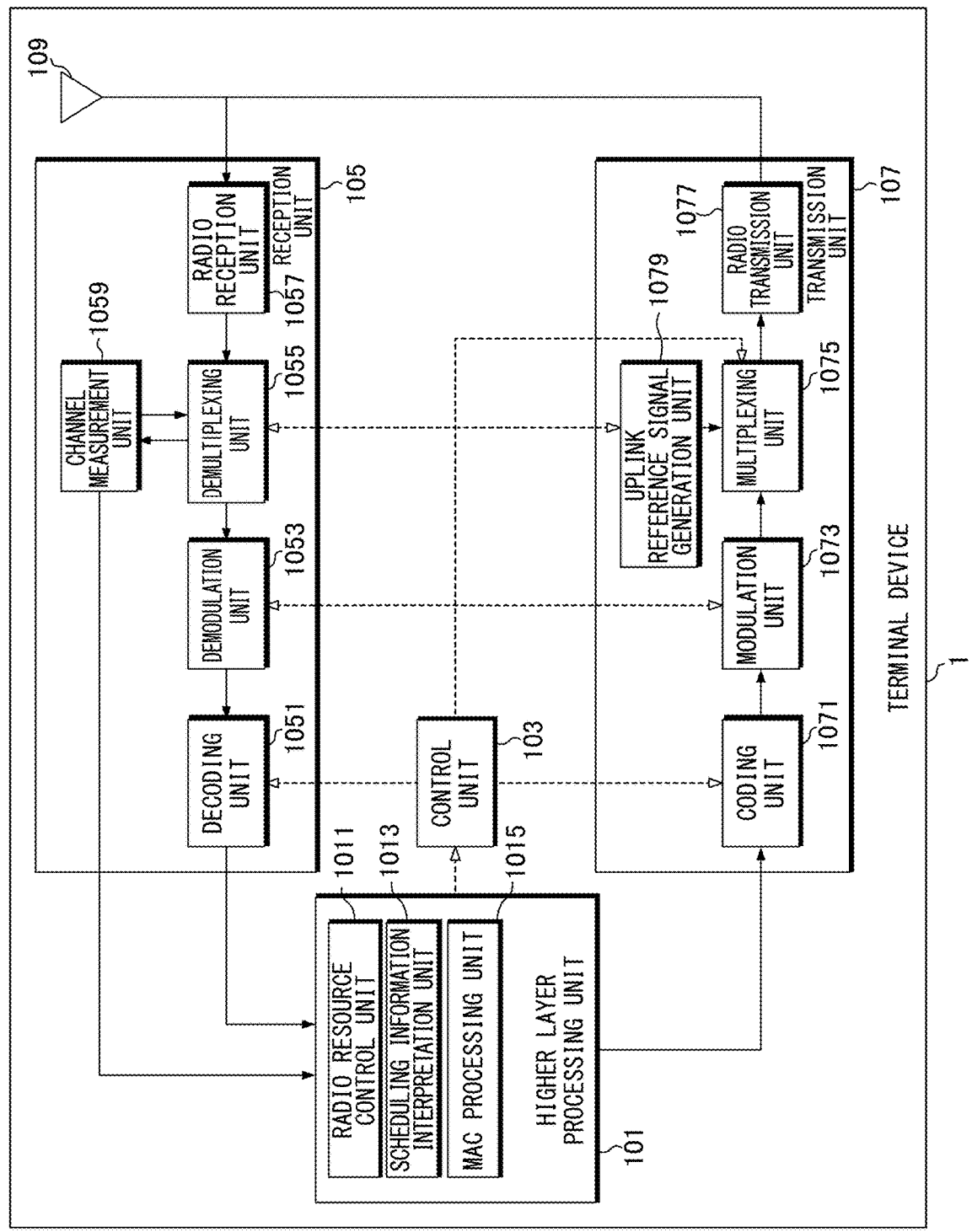
FIG. 6 is a schematic block diagram illustrating a configuration of a terminal device 1 according to the present embodiment.

FIG. 6 is a schematic block diagram illustrating a configuration of the terminal device 1 according to the present embodiment. As illustrated in the figure, the terminal device 1 is configured to include a higher layer processing unit 101, a control unit 103, a reception unit 105, a transmission unit 107, and a transmit and/or receive antenna 109. The higher layer processing unit 101 is configured to include a radio resource control unit 1011, a scheduling information interpretation unit 1013, and a MAC processing unit 1015. The reception unit 105 is configured to include a decoding unit 1051, a demodulation unit 1053, a demultiplexing unit 1055, a radio reception unit 1057, and a channel measurement unit 1059. The transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the uplink data (the transport block) generated by a user operation or the like, to the transmission unit 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various configuration information/parameters of the terminal device 1 itself. The radio resource control unit 1011 sets the various configuration information/parameters in accordance with higher layer signaling received from the base station device 3. To be more specific, the radio resource control unit 1011 sets the various configuration information/parameters in accordance with the information indicating the various configuration information/parameters received from the base station device 3. Furthermore, the radio resource control unit 1011 generates information to be mapped to each uplink channel, and outputs the generated information to the transmission unit 107. The radio resource control unit 1011 is also referred to as a configuration unit 1011.

Here, the scheduling information interpretation unit 1013 included in the higher layer processing unit 101 interprets the DCI format (scheduling information) received through the reception unit 105, generates control information for control of the reception unit 105 and the transmission unit 107, in accordance with a result of interpreting the DCI format, and outputs the generated control information to the control unit 103.

Moreover, the MAC processing unit 1015 included in the higher layer processing unit 101 controls the transmit power for transmission on the PUSCH and the PUCCH in accordance with various configuration information/parameters managed by the radio resource control unit 1011, a TPC command, and the like. Moreover, the MAC processing unit 1015 performs processing relating to the power headroom reporting. Here, a first MAC processing unit and a second MAC processing unit may be included in the MAC processing unit 1015. Furthermore, although one MAC processing unit 1015 is illustrated, two MAC processing units may be provided such as a first MAC processing unit 1015 and a second MAC processing unit 1015.

In accordance with the control information originating from the higher layer processing unit 101, the control unit 103 generates a control signal for control of the reception unit 105 and the transmission unit 107. The control unit 103 outputs the generated control signal to the reception unit 105 and the transmission unit 107 to control the reception unit 105 and the transmission unit 107.

In accordance with the control signal input from the control unit 103, the reception unit 105 demultiplexes, demodulates, and decodes a reception signal received from the base station device 3 through the transmit and/or receive antenna 109, and outputs the information resulting from the decoding, to the higher layer processing unit 101.

The radio reception unit 1057 converts (down-converts) a downlink signal received through the transmit and/or receive antenna 109 into a baseband signal through orthogonal demodulation, removes unnecessary frequency components, controls an amplification level in such a manner as to suitably maintain a signal level, performs orthogonal demodulation, based on an in-phase component and an orthogonal component of the received signal, and converts the resulting orthogonally-demodulated analog signal into a digital signal. The radio reception unit 1057 removes a portion corresponding to a Cyclic Prefix (CP) from the digital signal resulting from the conversion, performs Fast Fourier Transform (FFT) on the signal from which the CP has been removed, and extracts a signal in the frequency domain.

The demultiplexing unit 1055 demultiplexes the extracted signal into the PHICH, the PDCCH, the EPDCCH, the PDSCH, and the downlink reference signal. Moreover, the demultiplexing unit 1055 makes a compensation of channels including the PHICH, the PDCCH, the EPDCCH, and the PDSCH, from a channel estimate input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a Binary Phase Shift Keying (BPSK) modulation scheme, and outputs a result of the demodulation to the decoding unit 1051. The decoding unit 1051 decodes the PHICH destined for the terminal device 1 itself and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as Quadrature Phase Shift Keying (QPSK), 16 Quadrature Amplitude Modulation (QAM), or 64 QAM, and outputs a result of the demodulation to the decoding unit 1051. The decoding unit 1051 decodes the data in accordance with information on a coding rate notified with the downlink control information, and outputs, to the higher layer processing unit 101, the downlink data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101. Furthermore, the channel measurement unit 1059 calculates a downlink channel estimate from the downlink reference signal and outputs the calculated downlink channel estimate to the demultiplexing unit 1055. The channel measurement unit 1059 performs channel measurement and/or interference measurement in order to calculate the CQI (or the CSI).

The transmission unit 107 generates the uplink reference signal in accordance with the control signal input from the control unit 103, codes and modulates the uplink data (the transport block) input from the higher layer processing unit 101, multiplexes the PUCCH, the PUSCH, and the generated uplink reference signal, and transmits a result of the multiplexing to the base station device 3 through the transmit and/or receive antenna 109. Furthermore, the transmission unit 107 transmits uplink control information.

The coding unit 1071 performs coding, such as convolutional coding or block coding, on the uplink control information input from the higher layer processing unit 101. Furthermore, the coding unit 1071 performs turbo coding in accordance with information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. In accordance with the information used for the scheduling of the PUSCH, the modulation unit 1073 determines the number of data sequences to be spatial-multiplexed, maps multiple pieces of uplink data to be transmitted on the same PUSCH to multiple sequences through multiple input Multiple Input Multiple Output (MIMO) Spatial Multiplexing (SM), and performs precoding on the sequences.

The uplink reference signal generation unit 1079 generates a sequence acquired in accordance with a rule (formula) prescribed in advance, based on a physical layer cell identifier (also referred to as a Physical Cell Identity (PCI), a cell ID, or the like) for identifying the base station device 3, a bandwidth to which the uplink reference signal is mapped, a cyclic shift notified with the uplink grant, a parameter value for generation of a DMRS sequence, and the like. In accordance with the control signal input from the control unit 103, the multiplexing unit 1075 rearranges modulation symbols of the PUSCH in parallel and then performs Discrete Fourier Transform (DFT) on the rearranged modulation symbols. Furthermore, the multiplexing unit 1075 multiplexes PUCCH and PUSCH signals and the generated uplink reference signal for each transmit antenna port. To be more specific, the multiplexing unit 1075 maps the PUCCH and PUSCH signals and the generated uplink reference signal to the resource elements for each transmit antenna port.

The radio transmission unit 1077 performs Inverse Fast Fourier Transform (IFFT) on a signal resulting from the multiplexing, generates an SC-FDMA symbol, attaches a CP to the generated SC-FDMA symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and/or receive antenna 109 for transmission.

Figure 7:
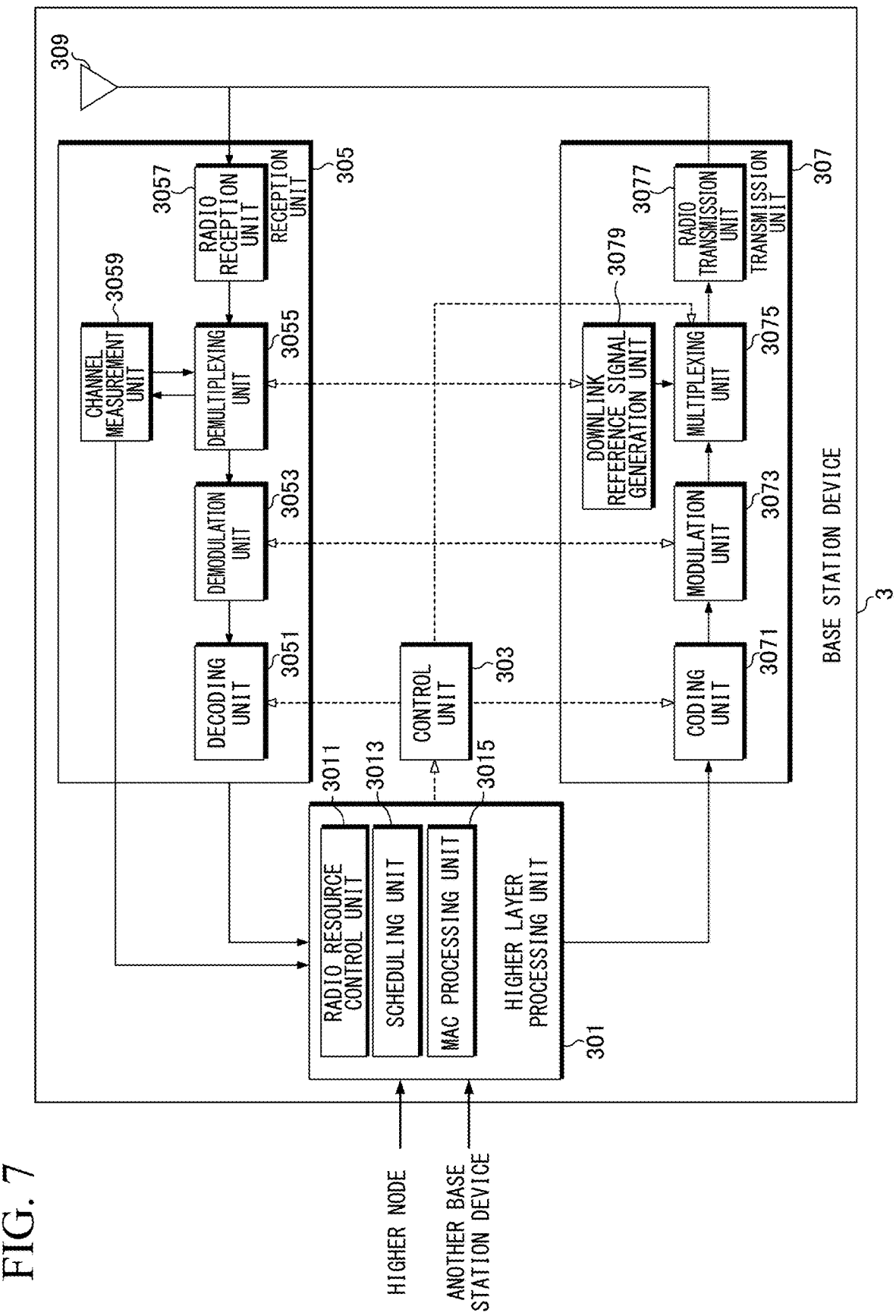
FIG. 7 is a schematic block diagram illustrating a configuration of a base station device 3 according to the present embodiment.

FIG. 7 is a schematic block diagram illustrating a configuration of the base station device 3 according to the present embodiment. As illustrated in the figure, the base station device 3 is configured to include a higher layer processing unit 301, a control unit 303, a reception unit 305, a transmission unit 307, and a transmit and/or receive antenna 309. The higher layer processing unit 301 is configured to include a radio resource control unit 3011, a scheduling unit 3013, and a MAC processing unit 3015. The reception unit 305 is configured to include a decoding unit 3051, a demodulation unit 3053, a demultiplexing unit 3055, a radio reception unit 3057, and a channel measurement unit 3059. The transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the reception unit 305 and the transmission unit 307, and outputs the generated control information to the control unit 303.

The radio resource control unit 3011 included in the higher layer processing unit 301 generates, or acquires from a higher node, the downlink data (the transport block) mapped to the downlink PDSCH, system information, the RRC message, the MAC Control Element (CE), and the like, and outputs a result of the generation or the acquirement to the transmission unit 307. Furthermore, the radio resource control unit 3011 manages various configuration information/parameters for each of the terminal devices 1. The radio resource control unit 3011 may configure various configuration information/parameters for each of the terminal devices 1 through higher layer signaling. In other words, the radio resource control unit 1011 transmits/broadcasts information indicating various configuration information/parameters. The radio resource control unit 3011 is also referred to as a configuration unit 3011.

The scheduling unit 3013 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimate, channel quality, or the like input from the channel measurement unit 3059. The scheduling unit 3013 generates the control information (e.g., the DCI format) in order to control the reception unit 305 and the transmission unit 307 in accordance with a result of the scheduling, and outputs the generated information to the control unit 303. The scheduling unit 3013 further determines timing of performing transmission processing and reception processing.

The transmit power control unit 3015 included in the higher layer processing unit 301 controls the transmit power for transmission on the PUSCH and the PUCCH performed by the terminal device 1, in accordance with various configuration information/parameters managed by the radio resource control unit 3011, a TPC command, and the like. Moreover, the MAC processing unit 3015 performs processing relating to the power headroom reporting. Here, a first MAC processing unit and a second MAC processing unit may be included in the MAC processing unit 3015. Furthermore, although one MAC processing unit 3015 is illustrated, two MAC processing units may be provided such as a first MAC processing unit 3015 and a second MAC processing unit 3015.

In accordance with the control information originating from the higher layer processing unit 301, the control unit 303 generates a control signal for control of the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and/or receive antenna 309, and outputs information resulting from the decoding to the higher layer processing unit 301. The radio reception unit 3057 converts (down-converts) an uplink signal received through the transmit and/or receive antenna 309 into a baseband signal through orthogonal demodulation, removes unnecessary frequency components, controls the amplification level in such a manner as to suitably maintain a signal level, performs orthogonal demodulation, based on an in-phase component and an orthogonal component of the received signal, and converts the resulting orthogonally-demodulated analog signal into a digital signal. The reception unit 305 receives uplink control information.

The radio reception unit 3057 removes a portion corresponding to a Cyclic Prefix (CP) from the digital signal resulting from the conversion. The radio reception unit 3057 performs Fast Fourier Transform (FFT) on the signal from which the CP has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. The demultiplexing is performed based on radio resource allocation information that is determined in advance by the base station device 3 using the radio resource control unit 3011 and that is included in the uplink grant notified to each of the terminal devices 1. Furthermore, the demultiplexing unit 3055 makes a compensation of channels including the PUCCH and the PUSCH from the channel estimate input from the channel measurement unit 3059. Furthermore, the demultiplexing unit 3055 outputs an uplink reference signal resulting from the demultiplexing, to the channel measurement unit 3059.

The demodulation unit 3053 performs Inverse Discrete Fourier Transform (IDFT) on the PUSCH, acquires modulation symbols, and performs reception signal demodulation, that is, demodulates each of the modulation symbols on the PUCCH and the PUSCH, in compliance with the modulation scheme prescribed in advance, such as Binary Phase Shift Keying (BPSK), QPSK, 16 QAM, or 64 QAM, or in compliance with the modulation scheme that the base station device 3 itself notified in advance with the uplink grant each of the terminal devices 1. The demodulation unit 3053 demultiplexes the modulation symbols of multiple pieces of uplink data transmitted on the same PUSCH with the MIMO SM, based on the number of spatial-multiplexed sequences notified in advance with the uplink grant to each of the terminal devices 1 and information designating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs the decoded uplink data and uplink control information to the higher layer processing unit 101. In a case where the PUSCH is re-transmitted, the decoding unit 3051 performs the decoding with the coded bits input from the higher layer processing unit 301 and retained in an HARQ buffer, and the demodulated coded bits. The channel measurement unit 309 measures the channel estimate, the channel quality, and the like, based on the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the downlink data that are input from the higher layer processing unit 301, multiplexes the PHICH, the PDCCH, the EPDCCH, the PDSCH, and the downlink reference signal, and transmits a result of the multiplexing to the terminal device 1 through the transmit and/or receive antenna 309.

The coding unit 3071 codes the HARQ indicator, the downlink control information, and the downlink data that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPS K, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal device 1 and that is acquired in accordance with a rule prescribed in advance, based on the Physical layer Cell Identifier (PCI) for identifying the base station device 3, and the like. The multiplexing unit 3075 multiplexes the modulated modulation symbol of each channel and the generated downlink reference signal. To be more specific, the multiplexing unit 3075 maps the modulated modulation symbol of each channel and the generated downlink reference signal to the resource elements.

The radio transmission unit 3077 performs Inverse Fast Fourier Transform (IFFT) on the modulation symbol resulting from the multiplexing or the like, generates an OFDM symbol, attaches a CP to the generated OFDM symbol, generates a baseband digital signal, converts the baseband digital signal into an analog signal, removes unnecessary frequency components through a lowpass filter, up-converts a result of the removal into a signal of a carrier frequency, performs power amplification, and outputs a final result to the transmit and/or receive antenna 309 for transmission.

More specifically, the terminal device 1 according to the present embodiment includes the reception unit 105 configured to receive the first parameter (extended-PHR) used to indicate that the power headroom is to be reported by using the first MAC control element, and to receive the second parameter (ScellPUCCH-PHR) used to indicate that the power headroom is to be reported using the second MAC control element, and the first MAC processing unit 1015 configured to acquire the type 2 power headroom. The MAC processing unit 1015 acquires the value of the type 2 power headroom for the primary cell, in a case that the first parameter (extended-PHR) is configured and that simultaneous transmissions on the Physical Uplink Control CHannel (PUCCH) and on the Physical Uplink Shared CHannel (PUSCH) are configured, and acquires the value of the type 2 power headroom for the primary cell regardless of whether the simultaneous transmissions on the Physical Uplink Control CHannel (PUCCH) and on the Physical Uplink Shared CHannel (PUSCH) are configured in a case that the second parameter (ScellPUCCH-PHR) is configured.

Moreover, the terminal device 1 according to the present embodiment includes the reception unit 105 configured to receive the first parameter (extended-PHR) used to indicate that the power headroom is to be reported by using the first MAC control element, and to receive the information used to configure Physical Uplink Control CHannel (PUCCH) resources for the secondary cell, and the first MAC processing unit 1015 configured to acquire the type 2 power headroom. The first MAC processing unit 1015 acquires the value of the type 2 power headroom for the primary cell regardless of whether simultaneous transmissions on the Physical Uplink Control CHannel (PUCCH) and on the Physical Uplink Shared CHannel (PUSCH) are configured, in a case that the first parameter (extended-PHR) is configured and that the Physical Uplink Control CHannel (PUCCH) resources are configured for the secondary cell, acquires the value of the type 2 power headroom for the secondary cell regardless of whether simultaneous transmissions on the Physical Uplink Control CHannel (PUCCH) and on the Physical Uplink Shared CHannel (PUSCH) are configured in a case that the first parameter (extended-PHR) is configured and that the Physical Uplink Control CHannel (PUCCH) resources are configured for the secondary cell and that the secondary cell is activated, and acquires the value of the type 2 power headroom for the primary cell, in a case that the first parameter (extended-PHR) is configured and that no Physical Uplink Control CHannel (PUCCH) resources are configured for the secondary cell and that the simultaneous transmissions on the Physical Uplink Control CHannel (PUCCH) and on the Physical Uplink Shared CHannel (PUSCH) are configured.

Here, the reception unit 105 receives the information used to configure Physical Uplink Control CHannel (PUCCH) resources for the secondary cell, and the first MAC processing unit 1015 acquires the value of the type 2 power headroom for the secondary cell regardless of whether simultaneous transmissions on the Physical Uplink Control CHannel (PUCCH) and on the Physical Uplink Shared CHannel (PUSCH) are configured, in a case that the second parameter (ScellPUCCH-PHR) is configured, that Physical Uplink Control CHannel (PUCCH) resources are configured for the secondary cell, and that the secondary cell is activated.

Moreover, the reception unit 105 receives the third parameter (dualconnectivity-PHR) used to indicate that the power headroom is to be reported using the third MAC control element, and the first MAC processing unit 1015 acquires the value of the type 2 power headroom for the primary cell, in a case that the third parameter (dualconnectivity-PHR) is configured and that simultaneous transmissions on the Physical Uplink Control CHannel (PUCCH) and on the Physical Uplink Shared CHannel (PUSCH) are configured, and the first MAC processing unit 1015 corresponds to the master cell group including the primary cell in the dual connectivity.

Moreover, in the dual connectivity, the second MAC processing unit 1015 corresponding to the secondary group including the primary secondary cell is provided, and the second MAC processing unit 1015 acquires the value of the type 2 power headroom for the primary secondary cell, in a case that the third parameter is configured, that simultaneous transmissions on the Physical Uplink Control CHannel (PUCCH) and on the Physical Uplink Shared CHannel (PUSCH) are configured, and the primary secondary cell supports transmission on the Physical Uplink Control CHannel (PUCCH) and contention based random access.

Moreover, the first MAC processing unit 1015 corresponding to the master cell group including the primary cell acquires the value of the type 2 power headroom for the primary secondary cell corresponding to the second MAC processing unit, regardless of whether simultaneous transmissions on the Physical Uplink Control CHannel (PUCCH) and on the Physical Uplink Shared CHannel (PUSCH) are configured, in a case that the third parameter (dualconnectivity-PHR) is configured.

Moreover, the second MAC processing unit 1015 corresponding to the secondary cell group including the primary secondary cell acquires the value of the type 2 power headroom for the primary cell corresponding to the first MAC processing unit, regardless of whether simultaneous transmissions on the Physical Uplink Control CHannel (PUCCH) and on the Physical Uplink Shared CHannel (PUSCH) are configured, in a case that the third parameter (dualconnectivity-PHR) is configured.

Here, the first MAC control element is identified by the first value of the logical channel ID, the second MAC control element is identified by the second value of the logical channel ID, and the third MAC control element is identified by the third value of the logical channel ID.

Moreover, the base station device 3 according to the present embodiment includes the transmission unit 307 configured to transmit the first parameter (extended-PHR) used to indicate that the power headroom is to be reported using the first MAC control element, and to transmit the second parameter (ScellPUCCH-PHR) used to indicate that the power headroom is to be reported using the second MAC control element. The first MAC processing unit 3015 receives the type 2 power headroom, the first MAC processing unit 3015 receives the value of the type 2 power headroom for the primary cell, in a case that the first parameter (extended-PHR) is configured and that simultaneous transmissions on the Physical Uplink Control CHannel (PUCCH) and on the Physical Uplink Shared CHannel (PUSCH) are configured and receiving the value of the type 2 power headroom for the primary cell, regardless of whether simultaneous transmissions on the Physical Uplink Control CHannel (PUCCH) and on the Physical Uplink Shared CHannel (PUSCH) are configured in a case that the second parameter (ScellPUCCH-PHR) is configured.

Moreover, the base station device 3 according to the present embodiment includes the transmission unit 307 configured to transmit the first parameter (extended-PHR) used to indicate that the power headroom is to be reported using the first MAC control element, and to transmit the information used to configure Physical Uplink Control CHannel (PUCCH) resources for the secondary cell, and the first MAC processing unit 3015 receives the type 2 power headroom. The first MAC processing unit 3015 receives the value of the type 2 power headroom for the primary cell regardless of whether simultaneous transmissions on the Physical Uplink Control CHannel (PUCCH) and on the Physical Uplink Shared CHannel (PUSCH) are configured in a case that the first parameter (extended-PHR) is configured and that the Physical Uplink Control CHannel (PUCCH) resources are configured for the secondary cell, receives the value of the type 2 power headroom for the secondary cell, regardless of whether the simultaneous transmissions on the Physical Uplink Control CHannel (PUCCH) and on the Physical Uplink Shared CHannel (PUSCH) are configured in a case that the first parameter (extended-PHR) is configured, that the Physical Uplink Control CHannel (PUCCH) resources are configured for the secondary cell, and that the secondary cell is activated, and receives the value of the type 2 power headroom for the primary cell, in a case that the first parameter (extended-PHR) is configured, that no Physical Uplink Control CHannel (PUCCH) resources are configured for the secondary cell, and that the simultaneous transmissions on the Physical Uplink Control CHannel (PUCCH) and on the Physical Uplink Shared CHannel (PUSCH) are configured.

Here, the transmission unit 307 transmits the information used to configure Physical Uplink Control CHannel (PUCCH) resources for the secondary cell, and the first MAC processing unit 3015 receives the value of the type 2 power headroom for the secondary cell, regardless of whether simultaneous transmissions on the Physical Uplink Control CHannel (PUCCH) and on the Physical Uplink Shared CHannel (PUSCH) are configured, in a case that the second parameter (ScellPUCCH-PHR) is configured and that the Physical Uplink Control CHannel (PUCCH) resources are configured for the secondary cell and that the secondary cell is activated.

Moreover, the transmission unit 307 transmits the third parameter (dualconnectivity-PHR) used to indicate that the power headroom is to be reported using the third MAC control element, the first MAC processing unit 3015 receives the value of the type 2 power headroom for the primary cell, in a case that the third parameter (dualconnectivity-PHR) is configured and that simultaneous transmissions on the Physical Uplink Control CHannel (PUCCH) and on the Physical Uplink Shared CHannel (PUSCH) are configured. The first MAC processing unit 3015 corresponds to the master cell group including the primary cell, in the dual connectivity.

Moreover, the second MAC processing unit 3015 corresponding to the secondary group including the primary secondary cell is provided in the dual connectivity, and the second MAC processing unit 3015 receives the value of the type 2 power headroom for the primary secondary cell, in a case that the third parameter (dualconnectivity-PHR) is configured and, that simultaneous transmissions on the Physical Uplink Control CHannel (PUCCH) and on the Physical Uplink Shared CHannel (PUSCH) are configured, and the primary secondary cell supports transmission on the Physical Uplink Control CHannel (PUCCH) and contention based random access.

Moreover, the first MAC processing unit 3015 corresponding to the master cell group including the primary cell receives the value of the type 2 power headroom for the primary secondary cell corresponding to the second MAC processing unit, regardless of whether simultaneous transmissions on the Physical Uplink Control CHannel (PUCCH) and on the Physical Uplink Shared CHannel (PUSCH) are configured in a case that the third parameter (dualconnectivity-PHR) is configured.

Moreover, the second MAC processing unit 3015 corresponding to the secondary cell group including the primary secondary cell receives the value of the type 2 power headroom for the primary cell corresponding to the first MAC processing unit, regardless of whether simultaneous transmissions on the Physical Uplink Control CHannel (PUCCH) and on the Physical Uplink Shared CHannel (PUSCH) are configured in a case that the third parameter (dualconnectivity-PHR) is configured.

Here, the first MAC control element is identified by the first value of the logical channel ID, the second MAC control element is identified by the second value of the logical channel ID, and the third MAC control element is identified by the third value of the logical channel ID.

As described above, with the power headroom reported, in the dual connectivity, the MAC entity corresponding to the master cell group in the base station device 3 can utilize the reporting of the type 2 power headroom for the secondary cell group to schedule a transmission on the PUSCH in the master cell group and a transmission on the PUSCH in the master cell group in the subframe where the transmission is performed on the PUCCH in the secondary cell group.

Moreover, as described above, with the power headroom reported, in the dual connectivity, the MAC entity corresponding to the secondary cell group in the base station device 3 can utilize the reporting of the type 2 power headroom for the master cell group to schedule a transmission on the PUCCH in the master cell group and a transmission on the PUSCH in the secondary cell group in the subframe where the transmission is performed on the PUSCH in the secondary cell group.

Moreover, as described above, with the power headroom reported, a single MAC entity in the base station device 3 can utilize the reporting of the type 2 power headroom for the secondary cell to schedule a transmission on the PUSCH in the primary cell and a transmission on the PUSCH in the primary cell in the subframe where a transmission is performed on the PUCCH in the secondary cell, in a case that the PUCCH secondary cell is configured.

Moreover, as described above, with the power headroom reported, one MAC entity in the base station device 3 can utilize the reporting of the type 2 power headroom for the primary cell to schedule a transmission on the PUCCH in the primary cell and a transmission on the PUSCH in the secondary cell in the subframe where the transmission is performed on the PUSCH in the secondary cell, in a case that the PUCCH secondary cell is configured.

Consequently, the processing relating to the transmit power can be efficiently performed.

The methods/processes relating to the transmit power have been described above with reference to the drawings, but specific configurations are not limited to the above descriptions and may include, for example, modifications to the above design that fall within the scope that does not depart from the spirit of the present invention. Furthermore, with respect to the present embodiment, embodiments obtained by suitably combining the above-described methods and processes are also included in the technical scope of the present invention.

A program running on each of the base station device 3 and the terminal device 1 according to the present invention may serve as a program that controls a Central Processing Unit (CPU) and the like (a program for causing a computer to operate) in such a manner as to enable the functionalities according to the above-described embodiment of the present invention. The information handled in these devices is temporarily stored in a Random Access Memory (RAM)

while being processed. Thereafter, the information is stored in various types of Read Only Memory (ROM) such as a flash ROM and a Hard Disk Drive (HDD), and as necessary, is read by the CPU to be modified or rewritten.

Moreover, the terminal device 1 and the base station device 3 according to the above-described embodiment may be partially achieved by a computer. In this case, this configuration may be realized by recording a program for realizing such control functions on a computer-readable recording medium and causing a computer system to read the program recorded on the recording medium for execution.

Note that it is assumed that the "computer system" refers to a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

Furthermore, the base station device 3 according to the above-described embodiment is realized as an aggregation (a device group) constituted of multiple devices. Each of devices constituting such a device group may be equipped with some or all portions of each function or each functional block of the base station device 3 according to the above-described embodiment. The device group may include at least general functionalities or general functional blocks of the base station device 3. Furthermore, the terminal device 1 according to the above-described embodiments can also communicate with the base station device as the aggregation.

Furthermore, the base station device 3 according to the above-described embodiment may serve as an Evolved Universal Terrestrial Radio Access Network (EUTRAN). Furthermore, the base station device 3 according to the above-described embodiment may have some or all portions of the functionalities of a node higher than an eNodeB.

Furthermore, some or all portions of each of the terminal device 1 and the base station device 3 according to the above-described embodiment may be realized as an LSI which is a typical integrated circuit or may be achieved as a chip set. The functional blocks of each of the terminal device 1 and the base station device 3 may be individually realized as a chip, or some or all of the functional blocks may be integrated into a chip. Furthermore, a circuit integration technique is not limited to the LSI, and may be realized with a dedicated circuit or a general-purpose processor. Furthermore, in a case that, with advances in semiconductor technology, a circuit integration technology with which an LSI is replaced appears, it is also possible to use an integrated circuit based on the technology.

Furthermore, according to the above-described embodiment, the terminal device is described as an example of a communication device, but the present invention is not limited to such a terminal device, and is applicable to a terminal device or a communication device of a fixed-type or a stationary-type electronic apparatus installed indoors or outdoors, for example, such as an Audio-Video (AV) apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

DESCRIPTION OF REFERENCE NUMERALS

1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 Scheduling information interpretation unit
1015 MAC processing unit
3011 Radio resource control unit
3013 Scheduling unit
3015 MAC processing unit

The invention claimed is:

1. A terminal device that communicates with a base station device by using a plurality of serving cells including a primary cell (Pcell) and a secondary cell (Scell), the terminal device comprising:
receiving circuitry configured to receive a parameter used for indicating that a power headroom is to be reported using an Extended Power Headroom medium access control (MAC) control element;
MAC processing circuitry configured to obtain a value of Type 2 power headroom for the Scell configured with a physical uplink control channel (PUCCH) in a case that the parameter is configured, the Scell is configured with the PUCCH, and the Scell configured with the PUCCH is activated; and
transmitting circuitry configured to transmit the value of Type 2 power headroom for the Scell configured with the PUCCH using the Extended Power Headroom MAC control element in a case that the parameter is configured, the Scell is configured with the PUCCH, and the Scell configured with the PUCCH is activated.

2. The terminal device according to claim 1, wherein the first MAC control element is a MAC control element of an extended power headroom.

3. A base station device that communicates with a terminal device by using a plurality of serving cells including a primary cell (Pcell) and a secondary cell (Scell), the base station device comprising:
   transmitting circuitry configured to transmit a parameter used for indicating that a power headroom is to be reported using an Extended Power Headroom medium access control (MAC) control element; and
   receiving circuitry configured to receive a value of Type 2 power headroom using the Extended Power Headroom MAC control element, wherein
      the value of Type 2 power headroom for the Scell configured with a physical uplink control channel (PUCCH) is received in a case that the parameter is configured, the Scell is configured with the PUCCH, and the Scell configured with the PUCCH is activated.

4. The base station device according to claim 3, wherein the first MAC control element is a MAC control element of an extended power headroom.

5. A communication method of a terminal device that communicates with a base station device by using a plurality of serving cells including a primary cell (Pcell) and a secondary cell (Scell), the communication method comprising:
   receiving a parameter used for indicating that a power headroom is to be reported using an Extended Power Headroom medium access control (MAC) control element;
   obtaining a value of Type 2 power headroom for the Scell configured with a physical uplink control channel (PUCCH) in a case that the parameter is configured, the Scell is configured with the PUCCH, and the Scell configured with the PUCCH is activated; and
   transmitting the value of Type 2 power headroom for the Scell configured with the PUCCH using the Extended Power Headroom MAC control element in a case that the parameter is configured, the Scell is configured with the PUCCH, and the Scell configured with the PUCCH is activated.

6. The communication method according to claim 5, wherein
   the first MAC control element is a MAC control element of an extended power headroom.

7. A communication method of a base station device that communicates with a terminal device by using a plurality of serving cells including a primary cell (Pcell) and a secondary cell (Scell), the communication method comprising:
   transmitting a parameter used for indicating that a power headroom is to be reported using an Extended Power Headroom medium access control (MAC) control element; and
   receiving a value of Type 2 power headroom using the Extended Power Headroom MAC control element, wherein
      the value of Type 2 power headroom for the Scell configured with a physical uplink control channel (PUCCH) is received in a case that the parameter is configured, the Scell is configured with the PUCCH, and the Scell configured with the PUCCH is activated.

8. The communication method according to claim 7, wherein
   the first MAC control element is a MAC control element of an extended power headroom.

\* \* \* \* \*